US012682444B2

(12) United States Patent
Orrell

(10) Patent No.:   US 12,682,444 B2
(45) Date of Patent:      Jul. 14, 2026

(54) PLANT DETECTION AND DISPLAY SYSTEM

(71) Applicant: CANON VIRGINIA, INC., Newport News, VA (US)

(72) Inventor: Hunter Orrell, Newport News, VA (US)

(73) Assignee: Canon Virginia, Inc., Newport News, VA (US)

( * ) Notice: Subject to any disclaimer, the term of this patent is extended or adjusted under 35 U.S.C. 154(b) by 493 days.

(21) Appl. No.: 18/265,647

(22) PCT Filed: Dec. 6, 2021

(86) PCT No.: PCT/US2021/062033

§ 371 (c)(1),
(2) Date: Jun. 6, 2023

(87) PCT Pub. No.: WO2022/125453

PCT Pub. Date: Jun. 16, 2022

(65) Prior Publication Data

US 2024/0037724 A1      Feb. 1, 2024

Related U.S. Application Data

(60) Provisional application No. 63/123,786, filed on Dec. 10, 2020.

(51) Int. Cl.
G06T 7/00               (2017.01)

(52) U.S. Cl.
CPC .. G06T 7/0004 (2013.01); *G06T 2207/10004* (2013.01); *G06T 2207/20081* (2013.01); *G06T 2207/30188* (2013.01)

(58) Field of Classification Search
CPC ......... G06T 7/0004; G06T 2207/10004; G06T 2207/20081; G06T 2207/30188;
(Continued)

(56) References Cited

U.S. PATENT DOCUMENTS 9,756,771 B2 *   9/2017   Redden ................. A01D 75/00
2015/0245554 A1 *   9/2015   Redden ..................... G06T 7/73
701/50
(Continued)

FOREIGN PATENT DOCUMENTS

EP          3620774 A1      3/2020
JP       H07318329 A      12/1995
(Continued)

OTHER PUBLICATIONS

Prasad, S., et al., "Mobile Mixed Reality Based Damage Level Estimation of Diseased Plant Leaf," 2014 Eighth International Conference on Next Generation Mobile Apps, Services, and Technologies, pp. 72-77.

(Continued)

*Primary Examiner* — Bobbak Safaipour
(74) *Attorney, Agent, or Firm* — Canon U.S.A., Inc., IP Division

(57)               ABSTRACT

A plant detection and display system obtains, from an image capture device, an image of a plurality of plants; execute detection processing on the obtained image using a trained model to classify each of the plurality of plants into a first category indicative of a defective plant having a quality score below a predetermined quality threshold or a second category indicative of a normal plant, determine, from the obtained image, position information for each of the plurality of plants classified in the first category; generate, using the position information, a map of the plurality of plants classified in the first category including an identifier around each of the plurality of plants; and provide the generated map to a terminal device for output on a display device providing visual representation of a location of each plant classified in the first class as a defective plant.

16 Claims, 19 Drawing Sheets

(58) Field of Classification Search
CPC .. G06T 2207/20084; G01N 2021/8466; G01N
21/8851; G01N 2021/8854; G01N
2021/8883; G01N 33/0098; A01G 31/06
See application file for complete search history.

(56) References Cited

U.S. PATENT DOCUMENTS

| | | | |
|---|---|---|---|
| 2017/0030877 A1 | 2/2017 | Miresmailli et al. | |
| 2018/0114092 A1 | 4/2018 | Huang et al. | |
| 2018/0330166 A1 | 11/2018 | Redden et al. | |
| 2019/0102646 A1 | 4/2019 | Redmon et al. | |
| 2019/0191630 A1 | 6/2019 | Regan et al. | |
| 2019/0200535 A1 | 7/2019 | Regan et al. | |
| 2019/0219499 A1 | 7/2019 | Gold et al. | |
| 2019/0244428 A1* | 8/2019 | Greenberg | G06T 7/001 |
| 2019/0311198 A1 | 10/2019 | Zemenchik | |
| 2020/0134392 A1 | 4/2020 | Gui et al. | |
| 2020/0134485 A1 | 4/2020 | Sood et al. | |
| 2020/0193589 A1 | 6/2020 | Peshlov et al. | |
| 2020/0279374 A1* | 9/2020 | King | G06V 10/50 |
| 2022/0104435 A1* | 4/2022 | Stewart | G06V 20/13 |
| 2022/0391752 A1* | 12/2022 | Grant | G06N 5/04 |
| 2022/0406043 A1* | 12/2022 | Shachar | G06V 10/7747 |

FOREIGN PATENT DOCUMENTS

| | | |
|---|---|---|
| JP | 2019-033769 A | 3/2019 |
| JP | 2020531014 A | 11/2020 |
| WO | 2019/241123 A1 | 12/2019 |

OTHER PUBLICATIONS

Prasad, S., et al., "Efficient Plant Leaf Representations: A Comparative Study," Proc. of the 2017 IEEE Region 10 Conference, Nov. 5-8, 2017, pp. 1176-1180.

* cited by examiner

Reference Mark

PLANT DETECTION AND DISPLAY SYSTEM

CROSS-REFERENCE TO RELATED APPLICATIONS

This application is a National Phase application of International Application No. PCT/US21/62033, filed Dec. 6, 2021, which claims the benefit of priority from U.S. Provisional Patent Application Ser. No. 63/123,786 filed on Dec. 10, 2020. The disclosures of the above-named applications are hereby incorporated by reference herein in their entirety.

BACKGROUND

Field

The present disclosure relates generally to image processing and, more specifically, detection and identification of plants in a vertical farming environment.

Description of Related Art

Vertical farming is the process by which plants are grown in a plurality of trays stacked vertically in order to maximize space and increase the amount of plants able to be grown in a certain area. Typically, the plants are grown in carefully controlled environmental conditions in order to ensure maximum yield. However, as is the case with conventional farming, inspection of the plants is needed to ensure that the plants are healthy and free from diseases. This manual visual inspection is time consuming and labor intensive as it requires human analysis of plants in each of the trays. More specifically, human operators need to physically analyze a growing tray to identify any diseased or "bad" plants (or leaves of the plants) and to monitor the changing health of the plants in the tray. This work flow is hard to scale because as you grow more plants you must also hire more operators to inspect and keep track of plant health and condition.

Human inspection presents a unique difficulty in the vertical farming environment because the structures that hold the trays tend to extend upward at heights that make it difficult for direct human inspection. One attempt at resolving these drawbacks in monitoring and maintaining the health of plants in a vertical farm include mounting and positioning of image capture devices. This solution allows for capturing video and presenting a live feed of the plants in various trays and presents a slight improvement over manual inspection as the inspection is now remotely performed and can occur more easily over all the trays. But, this solution still requires human inspection of a large area to monitor and determine the health of the plants. Additionally, plant health monitoring, when done remotely, requires a human user to go find where and which exact leaves were displayed as potentially defective. This is an issue because it can be hard to find where the particular grow tray is located in an array of vertically positioned grow trays and where on the particular grow tray the exact indicated leaves are located.

In a further attempt at resolving these drawbacks makes use of image processing techniques that perform object detection and which use machine learning to identify plants that are diseased. While these solutions automate the inspection process, the results still need to be validated by humans in order to determine if the object detection is correct as object detection performed using machine learning still results in erroneous determinations (e.g. false negative and false positive results). More specifically, machine learning has limitations which result in mistakes requiring human operators or reviewers to review and monitor the machine learning results for false positives and false negatives.

SUMMARY

The above drawbacks are remedied by the disclosed a plant detection and display system. The plant detection and display system includes a server comprising at least one memory storing instructions; and at least one processor that, upon execution of the stored instructions, is configured to obtain, from an image capture device, an image of a plurality of plants; execute detection processing on the obtained image using a trained model to classify each of the plurality of plants into a first category indicative of a defective plant having a quality score below a predetermined quality threshold or a second category indicative of a normal plant, wherein the trained model is a machine learning model trained using one or more visual characteristics associated with the plurality of plants indicating a defective plant; determine, from the obtained image, position information for each of the plurality of plants classified in the first category; generate, using the position information, a map of the plurality of plants classified in the first category including an identifier around each of the plurality of plants; and provide the generated map to a terminal device for output on a display device providing visual representation of a location of each plant classified in the first class as a defective plant.

According to another embodiment, the plant detection and display system is embodied in a vertical farm that includes one or more grow structures, each grow structure includes one or more trays each having a plurality of plants growing therein and each of the one or more grow trays including an image capture device moveable over its respective grow tray to capture images thereof and a server. The server includes at least one memory storing instructions, and at least one processor that, upon execution of the stored instructions, is configured to obtain, from each image capture device of the grow structure, images the plurality of plants in each of the one or more grow trays and, for each of the one or more grow trays, execute detection processing on the obtained image using a trained model to classify each of the plurality of plants into a first category indicative of a defective plant having a quality score below a predetermined quality threshold or a second category indicative of a normal plant, wherein the trained model is a machine learning model trained using one or more visual characteristics associated with the plurality of plants indicating a defective plant; determine, from the obtained image, position information for each of the plurality of plants classified in the first category; generate, using the position information, a map of the plurality of plants classified in the first category including an identifier around each of the plurality of plants; and provide the generated map to a terminal device for output on a display device providing visual representation of a location of each plant classified in the first class as a defective plant.

These and other objects, features, and advantages of the present disclosure will become apparent upon reading the following detailed description of exemplary embodiments of the present disclosure, when taken in conjunction with the appended drawings, and provided claims.

Figure 1:
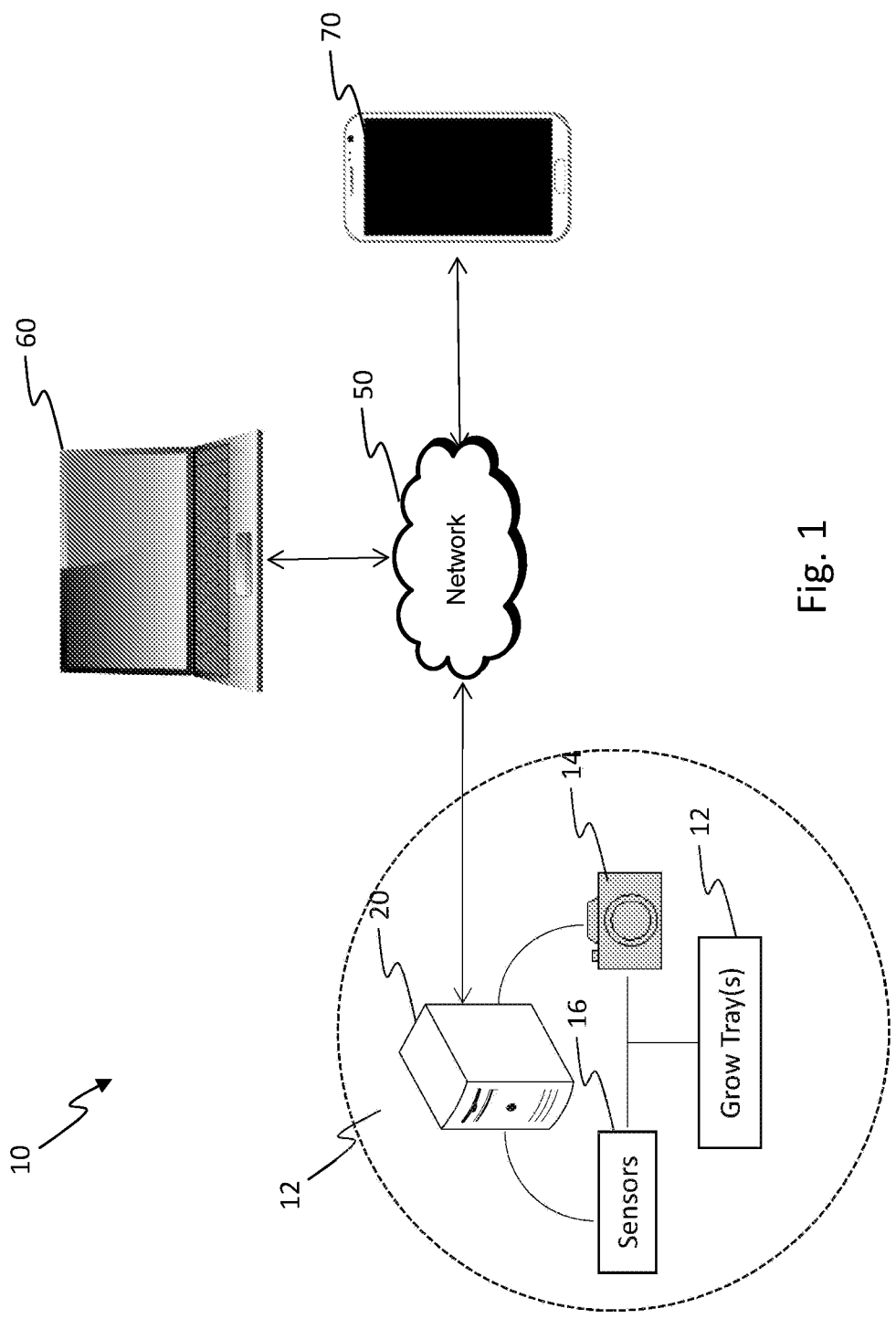
FIG. 1 illustrates the plant detection and display system.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

Described herein is a system for analyzing and detecting defective plants during the growing process. In one embodiment, the system described herein is deployed a vertical farming environment where a series of plants are being grown in a plurality of vertically stacked grow tray. Plants are living and always changing objects that must meet a certain quality check to be considered ok to harvest and sell. This quality check is currently done by human workers who must look at every single leaf to determine where issues such as mold or disease are occurring. This means growing facilities must spend additional money as they scale to analyze and monitor their plants health. The system according to the present disclosure improves the ability to both identify damaged or defective leaves by using machine learning model which has the improved ability to identify, from within a tray of a plurality of plants having a plurality of leaves, which of these leaves are defective. In so doing the system advantageously enables health-tracking of plants over a period of time while considering any environmental factors present at the growing facility. Continually capturing images of grow trays over the period of time which are then analyzed by the trained machine learning model allows for quick and precise identification of diseased or defective leaves in a particular grow tray so that they can more quickly be excised from the lot of healthy plants growing therein. In addition to quickly and accurately identifying the diseased or defective leaves, the system advantageously identifies, within the particular tray, the precise location of the leaves needing to be removed. The system generates an augmented reality view of the particular tray on a terminal device (e.g. mobile phone, tablet, or the like) with identifiers therein that indicate which of the leaves should be removed. Because of the sensitivity of the trained model, the defective leaves may not appear to be defective and may require significant time to analyze all leaves in a particular tray to identify which should be removed. The augmented reality display provided on the terminal immediately shows the position of the defective leaf within the tray so that it can be removed. In another embodiment, an marked image indicating the position of defective leaves can be provided as a map to a robotics device that can be used to remove the defective leaf without an individual needing to go to the grow rack to manually remove the identified defective leaf. As such, the present disclosure improves the technological field of vertical farming by providing an improved and more sensitive trained machine learning model which analyzes captured images of grow trays and improves how individuals or other systems are notified of the precise location of the defective leaves so that they can be removed from the growing environment by human or mechanical means.

FIG. 1 illustrates an exemplary plant detection and display system 10. The system 10 includes at least one grow location 11 that includes a plurality of grow trays 12 in which plants or other vegetation are grown. In one embodiment, as will be shown in FIGS. 2A-2C below, the grow trays are vertically stacked in one or more grow tray support racks in order to maximize the grow area. Each of the grow trays, both individually, and on a collective basis, are monitored by an image capture device 14. In one embodiment, each individual grow tray includes a respective image capture device that captures a series of images of the plants in the grow tray such that these images can be fed into an analyzed by a machine learning model that has been trained to detect defects in the plants being grown. The grow location 11 also includes one or more sensors 16 that are positioned throughout the grow location which sense and monitor one or more grow characteristics at a given time at the grow location 11. In one embodiment, the one or more sensors 16 include any one or more of (a) temperature sensor that measure temperature of the entire grow location 11; (b) a moisture sensor that measures an amount of moisture in the grow location 11; (c) a soil sensor measuring one or more characteristics of the soil at grow location; and (d) a pH sensor that measures the pH at the grow location. In other embodiments, the one or more sensors may further include a plant height sensor that measures the height of the plants this can be achieved through a laser or ultrasonic sensor or infrared sensor, a humidity sensor measuring humidity of the air, light sensor measuring the foot candle and or lux, a temperature sensor for the water, an electrical conductivity sensor for the water, water flow sensors which measure the flow of the water through pipes at various locations, air flow sensors which measure air flow at different locations, and a spectrometer which measures spectral signal at the growth location. The above one or more sensors 16 may be positioned to monitor the entirety of the grow location 11 and/or associated with a specific tray of plants at the grow location 11 to more precisely monitor the characteristic affecting the growth of the plants.

One or more servers 20 are provided and include one or more processors that execute one or more programs stored thereon in order to control the grow environment. This may, for example, include programs comprising computer executable instructions that control any characteristic at the grow location including but not limited to light, heat and water that is provided so that the plants are able to grow in the grow trays. Additionally, the server is able to receive inputs from any of the sensors 16 and the images captured by image capture devices 14 and use these inputs to make determinations about the quality of the leaves in particular grow trays and derive correlations between sensed environmental characteristics and defective leaves in particular grow trays 12. Specifics regarding the detection and analysis of captured images will be discussed hereinbelow in more detail. It should be understood that the illustration of the server 20.

A network 50 facilitates the connection of the one or more server 20 at the grow location 11 with one or more terminal devices such that the terminal device can receive data communicated by the one or more servers 20 via the network 50 to generate various types of graphical user interfaces that are able to represent the data received from the one or more server 20. The network 50 may be any suitable network. For example, one or more portions of the network 50 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 50 may include one or more interconnected networks. In operation, network 50 may be any network that enables bidirectional communication between one or more computing devices.

As shown herein, the network 50 connects first terminal device 60 and second terminal device 70 to the one or more servers 20. In one embodiment, the first terminal device 60 and second terminal device 70 are different types of computing devices. For example, the first terminal device 60 is a computing device such as a laptop whereas the second terminal device 70 is a mobile computing device such as a smartphone. In these instances, as will be discussed below, the first terminal device 60 may be used during a model training phase by a training module executing on server 20 whereby images captured by one or more image capture devices 14 are displayed and annotated to generate a training set of images labeled to indicate which leaves in the captured image are identified as damaged.

When training of the model is completed, future images of grow trays captured by the one or more image capture devices 14 are input into the trained model to be analyzed and classified. The trained model classifies individual leaves of plants as "defective" or "not defective" and generates a map of the grow tray 12 being analyzed to indicate the position of each leaf classified as "defective". In one embodiment, the second terminal device 70 may be selectively positioned near the grow tray 12 and cause an image of the grow tray 12 captured by the second terminal device to be displayed thereon and augmented with one or more identifiers overlaid on the capture image to indicate the defective leaves. This overlay is generated based on the map generated during the classification operation so that defective leaves can be removed.

Figures 2A, 2B, 2C:
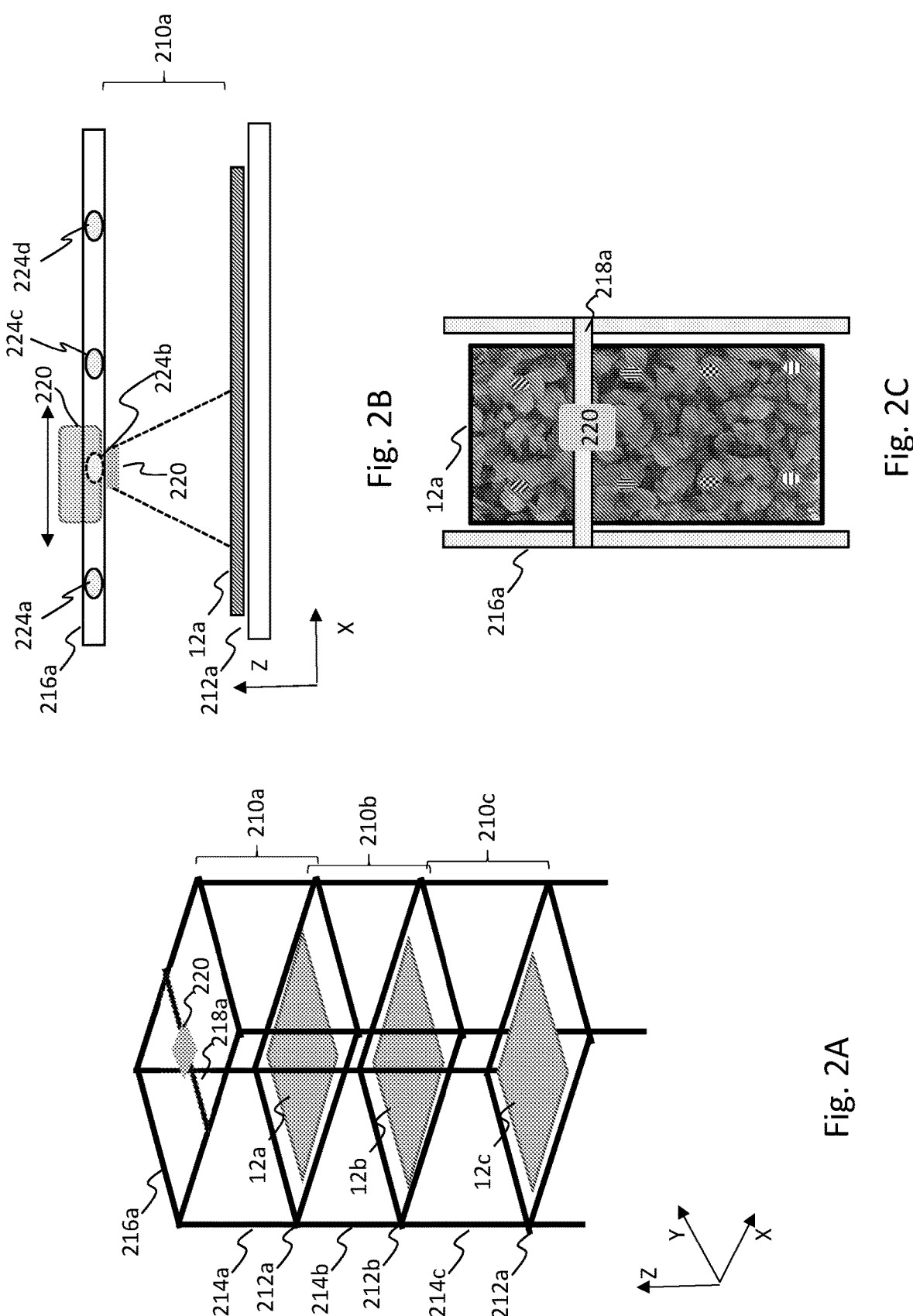
FIGS. 2A-2C illustrate aspects of the grow structures at a grow location.

FIGS. 2A-2C illustrate an exemplary structure at a grow location 11. In FIG. 2A a support structure 200 for a plurality of grow trays 12a-12c is provided. Preferably, each grow location includes a plurality of support structures 200 each supporting a plurality of grow trays 12 in order to maximize crop yield by providing a larger grow area resulting from vertically stacked grow trays 12. Support structure 200 includes at least one grow region 210. As shown in FIG. 2A, support structure 200 includes three grow regions indicated by reference numerals 210a-210c. It should be noted that the support structure 200 may, and preferably does, include more than three grow regions 210 supporting individual grow trays 12. The illustration provided herein is done for purposes of example only and for ease in understanding the described operation. Each grow region 210a-210c includes a lower support section 212a-212c, separation sections 214a-214c and upper support sections 216a-216c. As shown herein only upper support 216a is visible in FIG. 2A. However, it should be understood that upper support sections 216b and 216c in grow regions 210b and 210c, respectively, are included. In certain embodiments, a lower support section 212 may also function as an upper support section 216 for grow region located in a direction towards a ground surface. The lower support sections 212a-212c are configured to support grow trays 12a-12c, respectively. Separation sections 214a-214c are configured to separate the lower support sections 212a-212c and upper support sections 216a-216c and to allow for space between grow trays such that grow equipment such as watering devices, lights and the like may be configured as per the requirement of the plants being grown in grow trays 12a-12c which may or may not be of the same type of plant variety. Upper support section 216a-216c include a cross support 218. As shown in FIG. 2A, only cross support 218a is visible but it should be understood that each of grow region 210b and 210c also include respective cross support 218b and 218c. The cross support 218 includes a carriage 220 that supports at least one image capture device 222 shown in FIG. 2B.

Turning now to FIG. 2B, a cross section of grow section 210a is shown. Each grow section at a particular location has a unique grow section identifier the value of which is communicated to the server 20 when any data about the plants in the particular grow section is communicated to the server 20 of FIG. 1 as will be described hereinbelow. As seen herein, a portion of lower support section 212a is depicted and supports grow tray 12a having a plurality of plants growing therein. Each grow tray 12 includes a tray identifier that uniquely identifies the particular grow tray 12 in the particular grow section 210. The tray identifier is obtained and is also communicated to the server 20 when data about the plants in the particular grow tray 12 is communicated to the server 20 as will be described hereinbelow.

A portion of upper support section 216a is positioned above lower support section 212a and grow tray 12a and supported by separation section 214a (shown in FIG. 2A but omitted here). Upper support section 216 visualizes a plurality of tray markers 224a-224d that are located at predetermined positions within the grow tray 12 as indicated by the circles having various types of hatching in FIG. 2C. The various tray markers 224a-224d are positioned at known distances from one another and at known distances from the edges of the grow tray 12a. In one embodiment, each respective set of tray markers 224a-224d are positioned along a same line across the grow tray 12a. As shown herein, each set 224a-224d includes two tray markers however that is only for purposes of example and any number of tray markers can be included in a respective set of tray markers 224a-224d. Furthermore, while only four sets of tray markers are shown, it should be understood that any number of sets of tray markers 224a-224d can be deployed depending on the size of the grow area and/or grow tray. In certain embodiments, each individual tray marker with a respective set of tray markers include a secondary indicator that precisely identifies a particular area of the grow tray 12a. In other embodiments, the tray markers are not provided in sets and each tray marker is uniquely identifiable when captured and indicates a particular area in the grow tray.

The carriage 220 is positioned on cross support 218 as shown in FIG. 2A and supports one or more one image capture device 222 thereon. The one or more image capture device 222 supported by the carriage 220 is the same as image capture device 14, described generally as part of the system and illustrated in FIG. 1. The cross support 218 is moveable in an x-direction across a length of the upper support section 216a such that one or more image capture devices 222 supported by carriage 220 are in position to capture images along the entire surface of the grow tray 12a. In one embodiment, the carriage is controlled to move at predetermined times and remain at various positions along the length of the upper support for predetermined durations so that one or more images (e.g. still or video) of the plants in the grow tray 12a are captured. Also captured in the image data are any tray markers 224 that are present within the field of view. When the image is analyzed, the tray indicators advantageously provide the precise position of the image within the grow tray 12 because a distance of individual plant leaves can be determined based on a distance from one or more of a particular tray marker and an outer edge of the grow tray 12a. Data obtained from the images captured by the one or more image capture devices 222 are transmitted to the server 20 of FIG. 1.

Figure 3:
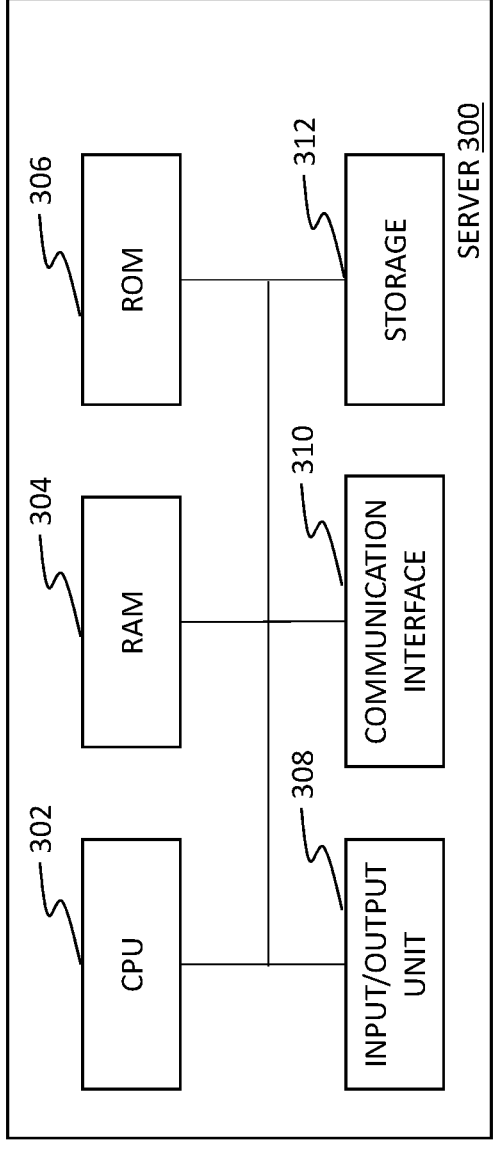
FIG. 3 is a block diagram detailing the hardware components of a server.

FIG. 3 illustrates the hardware components of the server 20 shown in FIG. 1. Server 20 is illustrated in FIG. 1 as being located at the grow location 11. However, it should be understood that the server 20 need not be physically on site at the grow location 11. Rather, the server 20 may be connected to the image capture devices and sensors at the grow location via communication network 50 in FIG. 1 and may be, for example, a cloud server or other remotely accessible server that is configured to perform the operations described in this disclosure.

The server 20 includes one or more CPU 302 which is configured to control the entire operations of server 20 by using a set of stored instructions and/or one or more computer programs in conjunction with data stored in the RAM 304 or ROM 306. The one or more CPUs may include one or more dedicated hardware or a graphics processing unit (GPU), which is different from the CPU 302, and the GPU or the dedicated hardware may perform a part of the processes by the CPU 302. As an example of the dedicated hardware, there are an application specific integrated circuit (ASIC), a field-programmable gate array (FPGA), and a digital signal processor (DSP), and the like. The RAM 304 temporarily stores the computer program or data read from the ROM 306, data supplied from outside via the communication interface 310 and/or data read from the storage 312, and the like. The ROM 306 stores the computer program and data which do not need to be modified. The ROM includes one or more control programs that control the operations of the server 20.

The input/output unit 308 includes one or more input components including but not limited to a joystick, a jog dial, a touch panel, a keyboard, a mouse, or the like, and receives user's operation, and inputs various instructions to the CPU 302. The input/output unit 308 includes output components including a display and or output port to enable connection to an external display device such that a graphical user interface may be displayed thereon. Additionally, the output component may include an audio output device such a speaker. The communication interface 310 communicates with external device such as PC, smartphone, cameras, sensors and the like. The communication with the external devices may be performed by wire using a local area network (LAN) cable, a serial digital interface (SDI) cable, wireless connection or the like, or may be performed wirelessly via an antenna. The communication interface 310 is configured to communicate using standard communication protocols such as WIFI, Bluetooth® and NFC.

Server 20 also includes storage 312 which may be any one of a hard disk drive, solid-state storage device or the like. It may be internal to the server 20 or alternatively may be a removable storage device. The storage 312 includes a plurality of control programs that are applications which may be executed by the one or more CPUs 302 in order to perform a particular type of operation. The control programs stored in storage 312 include computer executable instructions that are loaded into memory and which configure the one or more CPU's to perform certain operations. Storage 312 also enables program data and other data upon which operations are performed therein as shown in FIG. 4.

Figure 4:
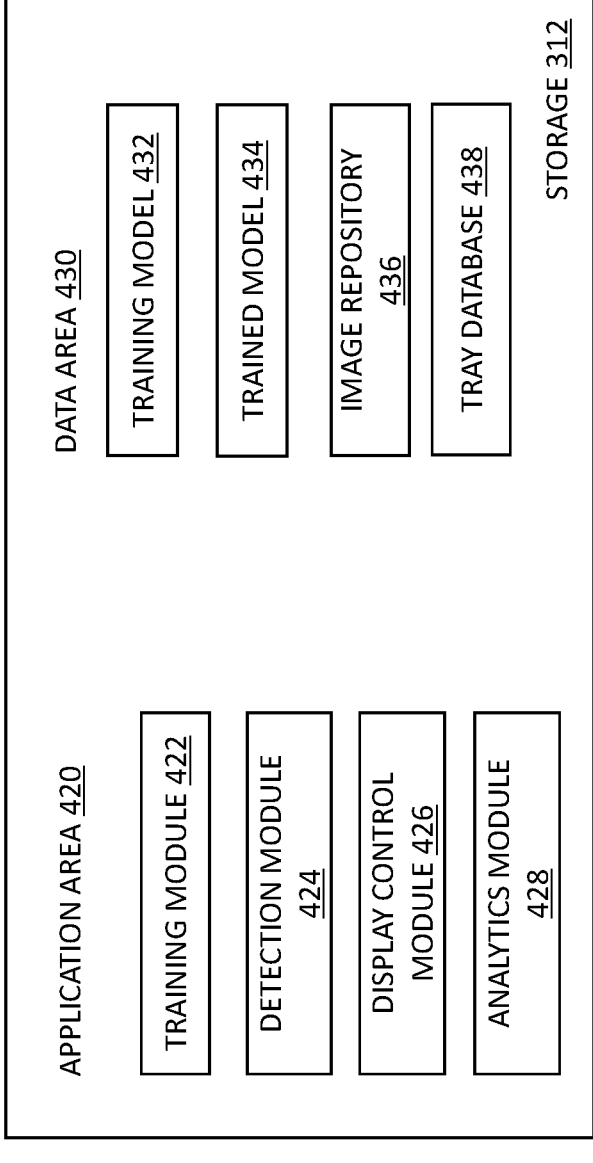
FIG. 4 is a block diagram detailing modules representing computer executable instructions executed by the server.

FIG. 4 is a block diagram illustrating respective programs and data objects stored in storage 312. For purposes of explanation, storage 312 includes an application area 420 that stores application programs comprised of computer executable instructions that configure the one or more CPUs 302 of server 20 to perform various operations. Storage 312 also includes data area 130 which stores object data that may be used by one or more of the applications stored in application area 420 when executed.

The application area 420 includes a training module 422, detection module 424 and display control module 426. The training module 422 is a set of instructions that, when executed, configure the one or more processors to generate training data which is used to train a machine learning model. This includes acquiring a series of images of plants that are growing in various grow trays and labeling portions of the acquired images to indicate the plants or leaves of the plants that are defective as determined by one or more plant characteristics such as shape, color, size, surface characteristics and the like. The acquired images that are annotated by a user using the training module may be stored in an image repository 436 in the data area 430 of storage 312. The training module 422 provides the labeled training data to a training model which is a machine learning model trained using the training data to identify, from a captured image of leaves, which leaves are defective. The training module 422 verifies the training such that classification of leaves as defective has at least an 80% accuracy score when compared to human labeled data sets. Once the training is completed, a trained model 434 is stored in data area 430 and is used by the detection module 424.

The machine learning model trained via the training module 422 is a convolutional neural network (CNN). The advantage of using a CNN for the system according to the present disclosure lies in its ability to automatically detect important features of the images used to train the model based on labeled images indicting that the leaves (or plants) are defective. In addition, the computational efficiency provided by a CNN makes this especially ideal for processing the data in order to classify images of plant leaves as defective or not defective. This is particularly important because of the commonality between the objects (e.g. leaves) in the captured image. The ability to identify patterns and particular features of images labeled as defective improves the functionality of the model once it is trained which ultimately improves detection performed on unlabeled image data.

Figure 5:
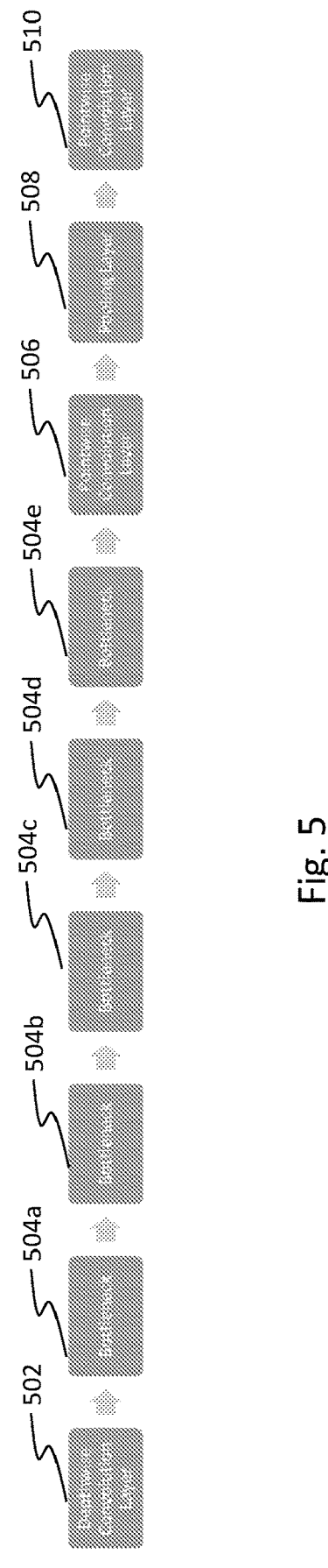
FIG. 5 is a block diagram representing the structure of a machine learning model.

An exemplary structure of the CNN model 500 is illustrated in FIG. 5. The CNN model 500 depicted in FIG. 5 was designed with focus on speed at which images are to be processed without compromising accuracy. More specifically, the CNN model 500 was designed to identify identifying a plurality of object characteristics including, but not limited to colors, surface patterns, edges, size, and shape of the leaves. The larger convolutional layers' feature maps focus on color, edges, shape, and size, while the deeper layers focus more intently on the surface details of the leaf. While the focus of the deeper layers is indicated as being on surface details, these deeper layers also analyze images for all features but at a more refined size that the global, earlier positioned layers. The number of convolutional layers has been minimized to focus primarily, and more heavily on leaf sizes which would allow for faster training time and to provide better accuracy. The activation layer is a standard rectified linear unit as it more computationally efficient as it is less like a sigmoidal activation layer. Furthermore, the hyperparameters were tuned with special focus on characteristics related to the intersection of union (IOU), false negatives/false positives allowances, and batch sizing. IOU is particularly relevant in leaf detection due to the face that the leaves are all very close to each other and many are overlapping which might results in training locations having overlapping ground truths but only a single one of the overlapped leaf would be detected. As a result the hyperparameter related to IOU was tuned by increasing the IOU overlap parameter to require that bounding locations be highly overlapping.

The model 500 includes a first convolutional layer 502 into which the image in input and analyzes all layers of the image (e.g. RGB) to output a tensor having a dimension of 1×8K neurons across a layer. From there, the tensor flows through a plurality of bottleneck layers 504a-504e which are shortcut convolutional layers that reduces the number of overall nodes needed to process the image and also reduced the degradation of data at each successive layer. In each layer, the tensor input thereto is uncompressed, filtered and recompressed before exiting to the subsequent layer.

Bottlenecks layers are used to reduce computational needs and reduce size of data in the network. Each bottleneck has different factors that are manually defined for its expansion factor, repeating factor which sets the number of times the layer is repeated, output channels and stride. For example, the number of input channels at that first bottleneck layer is less than the input channels at subsequent bottleneck layers. The expansion factor at each bottleneck determines when data calculation are performed including how tensor is expanded and re-compressed. During the analysis the parameter defining the stride at each layer indicates a size and movement of the filter across the image input into layer to perform analysis thereon.

The present CNN model 500 analyzes, at a macro level, shape of the leaves contained in the acquired image. For the other characteristics, it is key that the analysis be performed on the macro scale but also on a micro scale to identify features from the images labeled as ground truths in order to better detect defective leaves present in subsequent, unlabeled image data. Thus, the model needs to be flexible to obtain information at the macro and micro level. To achieve this, analysis begins using large filters but quickly move to smaller size filters to extract smaller details in order to determine and identify where one leaf ends and other begins. Smaller filters also allow us to identify other features of leaf such as color, edges, surface characteristics and the like.

After flowing through bottleneck layers 504a-504e, the tensor is output into a pointwise convolutional layer 506 to analyze each point in the image, the result of which flows to the pooling layer 508 to reduce the resolution of the feature map. A final pointwise convolutional network is positioned downstream of pooling layer 508 in order to apply a final compression and output the binary classification as a defective leaf or not defective leaf.

In exemplary operation, the training module 422 is executed by the one or more CPUs 302 of the server and receives an image of a grow tray at a grow location. The received image may be transferred to the image repository 436. The training module 422 generates a graphical user interface (GUI) that includes the captured image of the grow tray. The GUI includes a labeling function that allows a human user to manually annotate the received image of the grow tray with ground truth identifiers positioned over leaves that are visually identified as defective. The position of the ground truth indicators are defined at particular x and y coordinates within the image and also include information identifying a height and width of the ground truth indicator. The labeling information that identifies the position and size of each respective ground truth box is output into a data file (e.g. an extensible markup language (XML) file) that, in conjunction with the original image, are associated with one another as a "labeled dataset".

Figure 6:
FIG. 6 is a graphical user interface output by the detection and display system.

An exemplary GUI generated by the training module and output to a display device is shown in FIG. 6. Therein, an image of plants in a grow tray is displayed within the GUI and a user can review the image and manually identify respective leaves that are defective by using an input device such a mouse or touch screen. Upon receipt of the user input with the GUI, the training module 422 identifies location information associated with each ground truth indictor input by the user (visually represented by the plurality of boxes shown in FIG. 6). The training module 422 further outputs ground truth identifier size information representing a size of the ground truth identifier input by the user. The location information and ground truth size information is output into a data file having a predetermine format (e.g. XML). The training module 422 associates the data file with the original image as the labeled dataset. This process repeated until sufficient number of images and associated data files are completed.

After generating sufficient number of images and associated data files, the training module 422 trains the machine learning model such as described above in FIG. 5. After training for a period of time the training can be stopped and the model 500 can be frozen and caused to be stored in storage 312 as a trained model 434 that can be later used to analyze unlabeled image data to identify defective leaves.

Figure 7:
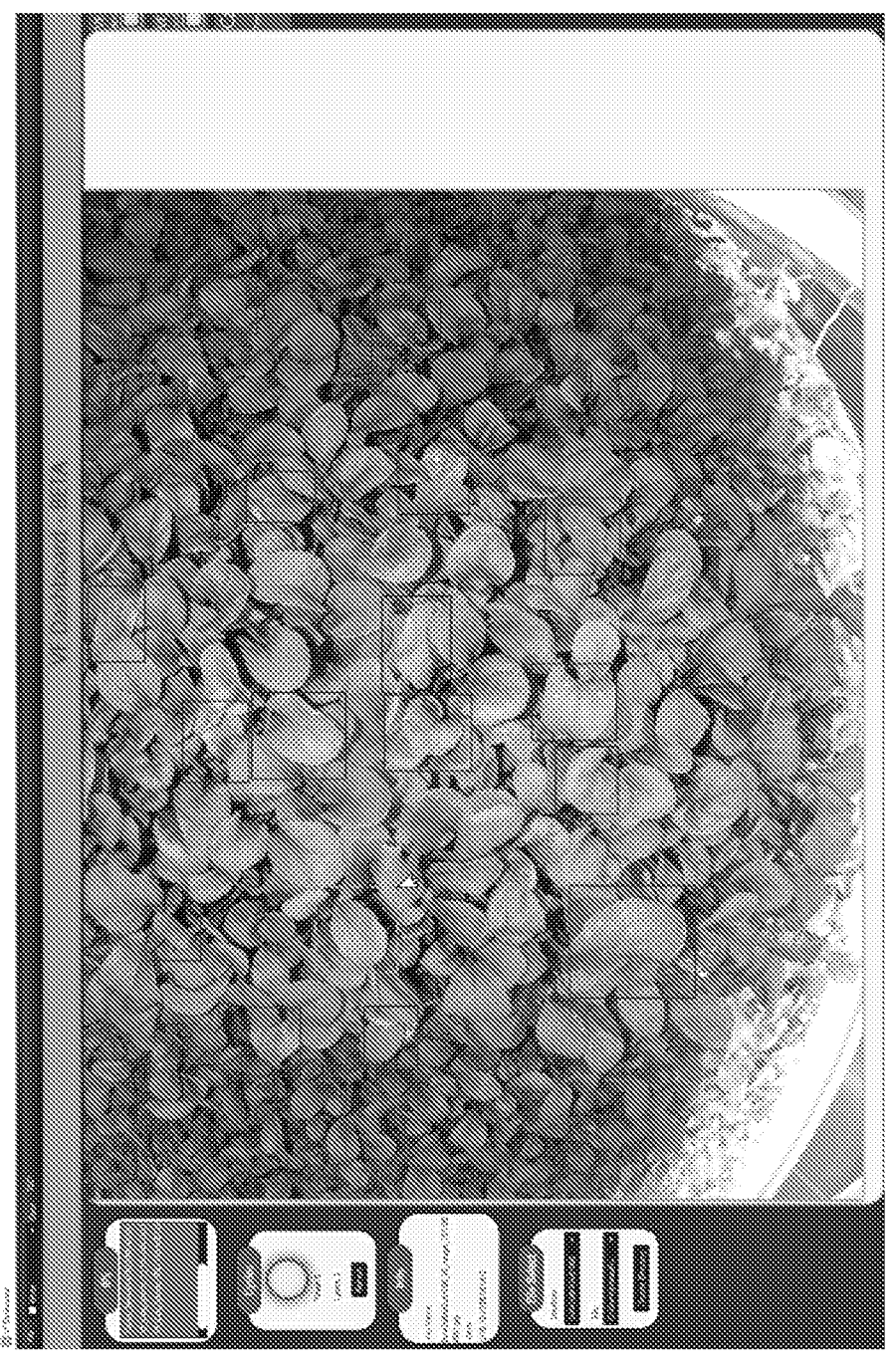
FIG. 7 is a graphical user interface output by the detection and display system used for providing feedback based on the detection results.

The detection module 424 requires there be a completed trained model 434 which is stored in storage 312. When detection operation is to be performed, the detection module 424 acquires raw image data from one or more image capture devices that capture images of respective grow trays. As used herein, the term raw image data indicates an image containing a plurality of objects that are to be classified into at least two categories and that is unlabeled such that there is no indication as to whether the objects in the captured image belong to any of the at least two categories. The acquired image is provided to the trained model 434 in order to determine a category that each object in the acquired image belongs. In operation, the objects in the capture image are plant leaves and the trained model analyzes each raw image input therein to classify the plant leaves as defective or not defective. While this classification is made, the detection module 424 generates a GUI including object in the image that the model has determined to be "defective". An exemplary GUI output by the detection module is shown in FIG. 7. The GUI include generates an annotated image that includes classifiers in the form of boxes that overlay the raw image to visualize, for the user, which plant leaves are defective. As shown in FIG. 7, the identifiers are bounding boxes and include a label indicating a confidence score that the determined classification is accurate.

Execution of the detection module 424 causes the server 20 to acquire an image from an image capturing device that transferred to the image repository 436 in storage 312 and stored as raw image data. Also stored in association with the raw image data is a location at which the image was captured. The detection module 424 provides the stored image data to the trained model 434 which is used to perform object detection on the raw image to yield an inference as to the category to which the detected object belongs (e.g. defective or not defective). The resulting object detection and inference are output on the image displayed in the GUI (e.g. FIG. 7) in the form of boxes each having a location and size associated therewith indicating a detected result of a plant or leaf. These detections also have a confidence percentage where 100% would be the highest confidence indicating that an object within an image is correctly classified as defective. A user is able to set a threshold for what percentage is valid for a confident detection, where if a user selected an 80% threshold, all detections less than 80% would not be classified as defective. One confidence threshold is during training which defines what percent the detection must have to be declared a positive detection. This confidence threshold is not changeable during or after training it is a static preset value. After training we also have a confidence threshold setting which can be changed which does the same thing but for inference of the trained model. In this embodiment, this confidence threshold is changeable The classifications performed by the detection module are output as a detection data file that includes the location of each box based on x and y coordinates along with size information of each box indicating a height and width in pixels of each box. A new image file is generated in parallel with the text file generation which is the original image that was analyzed with static boxes drawn onto the image with confidence scores shown above as shown in FIG. 7.

Figure 8:
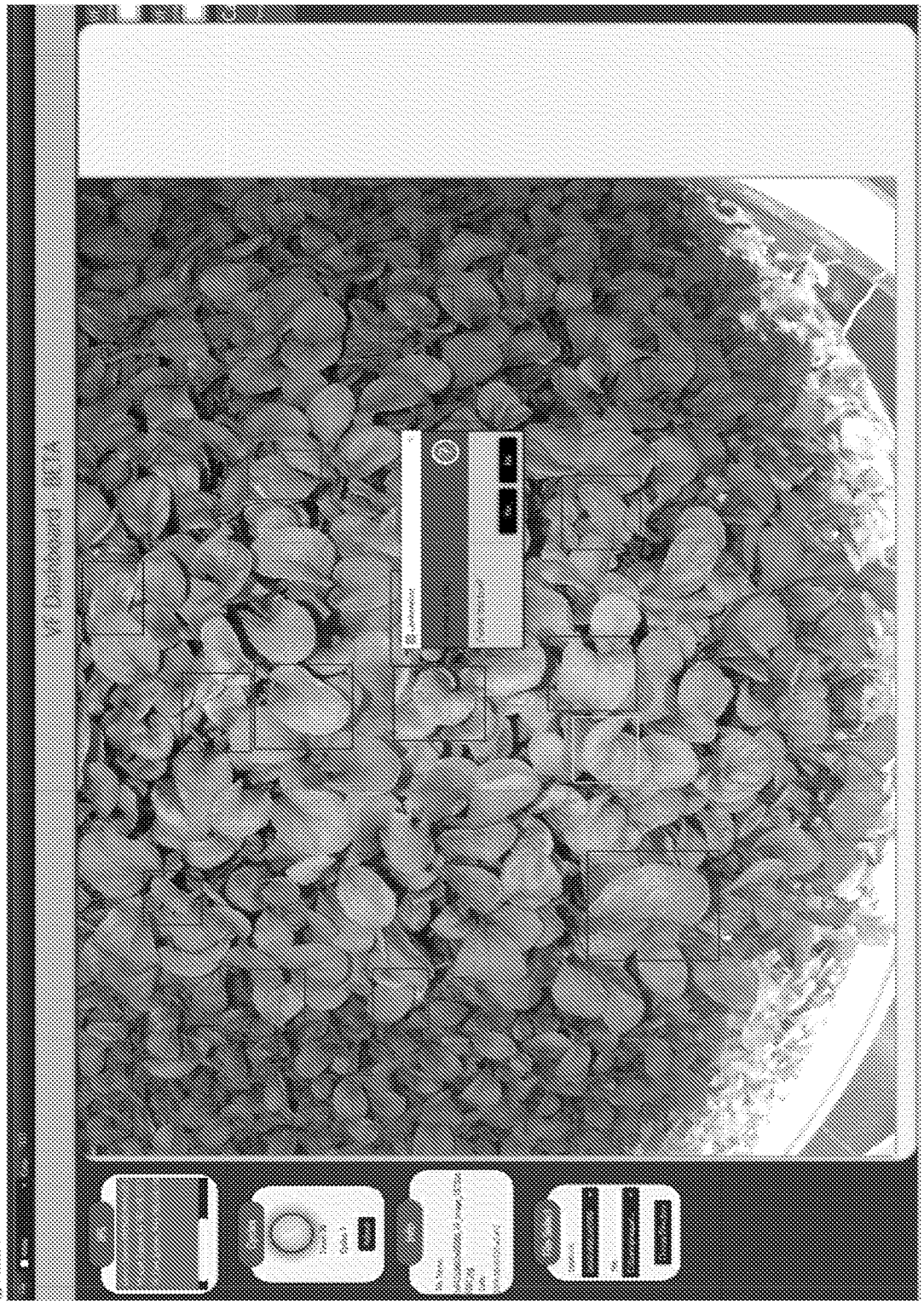
FIG. 8 is a graphical user interface output by the detection and display system used for providing feedback based on the detection results.

In one embodiment, the detection module 424, after performing detection on raw image data, performs feedback functionality on the image that has been classified such as shown in FIGS. 7 & 8. During feedback functionality, the detection module can obtain, from the image repository the original raw image data and detection data file that includes the location of the classifiers and the size of the classifiers. The GUI uses the location and size data for the classifiers to overlay the classifiers on the raw image data. Unlike the image shown in FIG. 7, in this embodiment, the classifiers are generated to be user selectable. An exemplary GUI for performing the feedback functionality is shown in FIG. 8. The GUI is generated based on the detection data file that contains the x, y coordinates and widths and heights of boxes which indicate the position of the classifiers as determined during the object detection operation. The GUI then generates these boxes representing the classifiers at their respective locations and sizes on top of the original image. The boxes are not embedded or permanently drawn on top of the original image. The boxes are selectable by the user in order to remove boxes that the user determines to be an improper classification. A user has the ability to select one or more boxes for deletion. A user is also able to "add" boxes by selecting a location and drawing a boundary box around one or more objects (e.g. leaves) that were not classified as defective but which the user believes should have been. The feedback function ends when the user finalizes the image. Upon deleting one or more classifier boxes, an updated detection data file is generated by coping the original detection data file and deleting location and size information for classifier boxes that were deleted and adding location and size information for newly appended classifier boxes. The updated detection data file is stored in associated with the original image and can be added to the labeled data set that was used to initially train the trained model 434. This allows for updated training data to be provided for subsequent re-training of the model. In one embodiment, updated detection data file is in XML format and is stored in the image repository 436 along with its corresponding original image file that on which feedback operations have been performed. These can be added to the original "labeled dataset" which was used to originally train the object detection model. This "updated labeled dataset" can have a plurality of generated XML detection files and original images added prior being retrained. In one embodiment, a user can select when to initiate retraining of the model which may be performed by executing a retrain function of the training module 422. In another embodiment, a threshold for new images and/or updated detection data files may be set and, upon reaching the threshold, the training module 422 automatically retrains the model using the updated labeled dataset. This would allow for the output of the object detection model to be reviewed by a human and adjusted and fed back into the model as and updated labeled dataset to adjust the models accuracy to what the human would like to see detected and not detected. During the retraining operation, the training model 432, which after initial training is in the same state as the trained model 434, is accessed by the training module 422 and updated labeled dataset is fed into the training model for subsequent training. At the conclusion thereof, an updated trained model 434 is saved in the storage and will be used for subsequent objection detection operations.

In another embodiment, after obtaining detection results, a display control module 426 can be executed to perform augmented reality display on a terminal device such as mobile phone 70 shown in FIG. 1. In this embodiment, mobile phone 70 includes hardware similar to the hardware of server 20 shown in FIG. 3 with certain additional elements that are specific to mobile computing devices. More specifically, as is known, the mobile computing device may be a smartphone which includes input/output components of one or more mobile capture devices such as front and rear facing cameras that can be operated to capture images. Additionally, the mobile computing device includes one or more touch screen displays that can selective display information thereon and receive input from a user to perform control operations for controlling the mobile computing device. This exemplary post-detection processing is described with respect to FIGS. 9-16.

Figure 9:
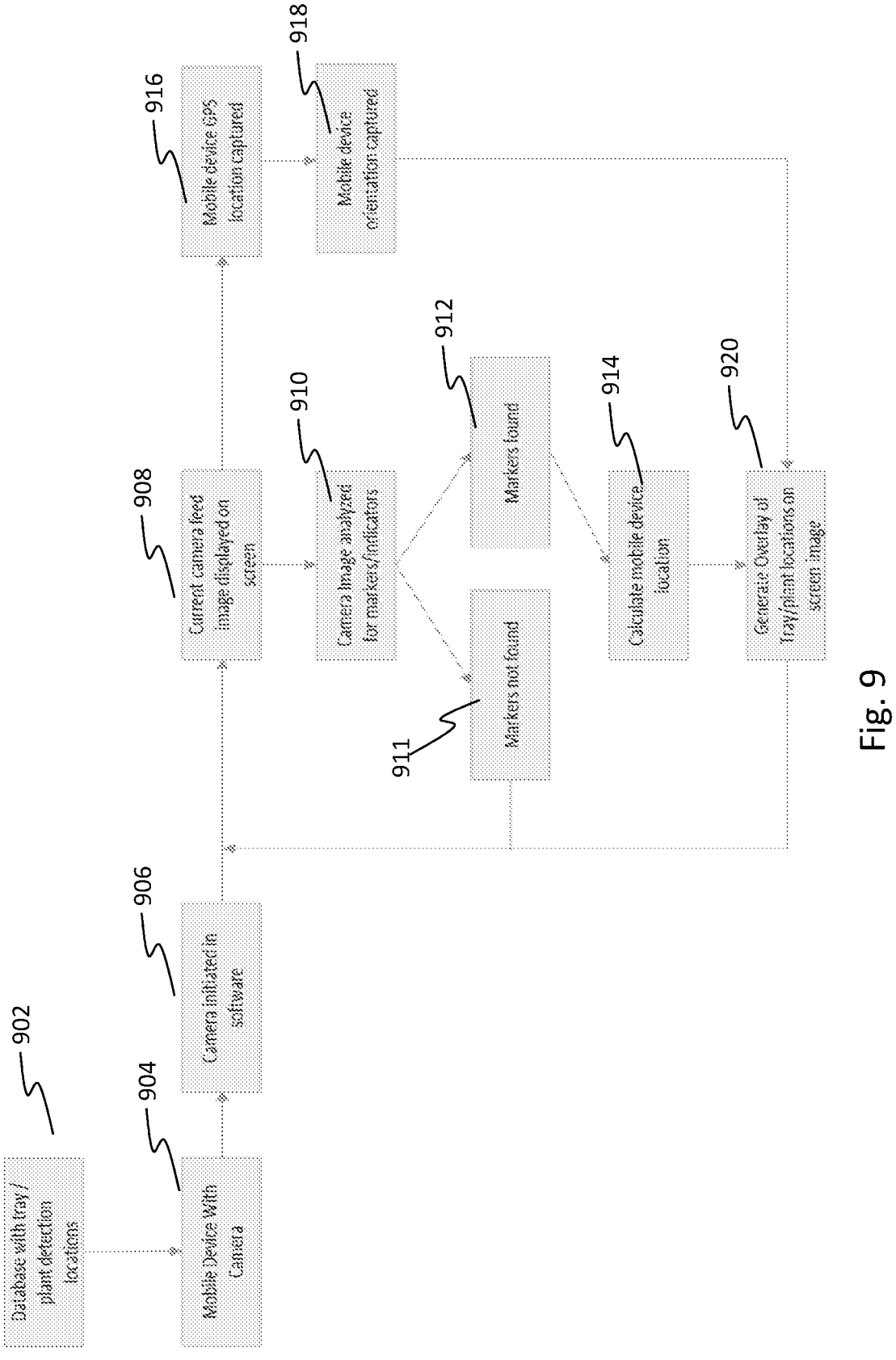
FIG. 9 is a flow diagram detailing an algorithm for control display of a graphical user interface on a mobile computing device.

A flow diagram detailing an exemplary algorithm for generating an augmented display is illustrated in FIG. 9. In exemplary operation, the mobile computing device includes a corresponding display control module stored in the storage thereof which is separately executed by one or more processors of the mobile computing device to perform the operations described herein. In another embodiment, the mobile computing device includes a terminal application that, when executed, establishes communication between the mobile computing device and the server 20 via a communication network such as network 50 shown in FIG. 1. In the embodiment where the application executing on the mobile computing device is a terminal application, the display control module 426 of server receives data obtained by the mobile computing device, performs the described processing, and communicates the processed information back to the mobile computing device for display on the touchscreen of the mobile computing device.

As shown in FIG. 9, in block 902, detection information determined by the detection module 424 along with plant location information from the tray database 438 in FIG. 4 is provided to the mobile computing device. From this information, the mobile computing device can be used to augment an image of a grow tray currently being captured by the image capture device of the mobile computing device. This augmented display visibly displays the precise location of the one or more plant leaves in currently captured image of the grow tray that are classified as being defective.

In block 904, the augmented display application is executed on the mobile computing device to dynamically display detection results associated with a particular grow tray. As a result of blocks 902 and 904, the mobile computing device obtains the object detections results and known object (tray) locations identify leaves classified as defective. At block 906, the mobile computing device initiates image capture using one or more image captured devices of the mobile computing device. The image capture operation captures one or more images of a particular grow tray containing a plurality of plants which have undergone object detection and the live image being captured by the mobile computing device is displayed on the display thereof as shown in block 908. Upon display of the image, two processing operations occur substantially in parallel. A first processing operation identifies the particular object in the image being displayed that are classified as shown in blocks 910-914 and the location and orientation of the mobile computing device are determined in blocks 916-918. The results of both of these processing operations are used to generate the augmented display as will be discussed in block 920.

Turning first to the location and orientation determination, a location of the mobile computing device with camera is collected or determined. In block 916, the location of the mobile computing can be collected through many different ways such as Global Positioning System (GPS), compass, and Inertial Measurement Unit (IMU), Quick Response (QR) code orientation with camera, or reference point markers, Augmented Reality (AR) location linking, or any other method of defining the user's location relative to the environment around them. Upon determining the location of the mobile computing device, an orientation of the mobile computing device with respect to the grow tray is determined in block 918. The location and orientation information is provided to the display control module and used, as will be discussed below, with the detection information to generate the augmented image for display on the mobile computing device.

Returning back to block 908, the image being captured by the mobile computing device is also analyzed in block 910 for tray markers or other indicators that can be used to identify the grow tray, or portion thereof, that is being captured at a current time. In a case where no markers are found as shown in block 911, a prompt may be provided to a user via the display on the mobile computing device that suggests moving the mobile computing device to capture other regions of the grow tray to identify grow tray information from within the image being captured. In a case where the image being captured at current time includes one or more tray markers or indicators that identify the particular grow tray as determined in block 912, the mobile computing device location is determined in block 914 and the image captured by the mobile computing device is overlaid with an indication of where the plants that are classified as defective as per the detection results obtained in block 902.

This image overlay and user location determination are continuously repeated as the image being captured is a live view image and because the mobile computing device location is also always changing. Because the object detection locations and sizes of the detected objects and the location of the user are known, the display control module 426 can generate an augmented reality view by overlaying the location of the object detection results on the live-view image being captured by the image capture device of the mobile computing device.

Figure 10:
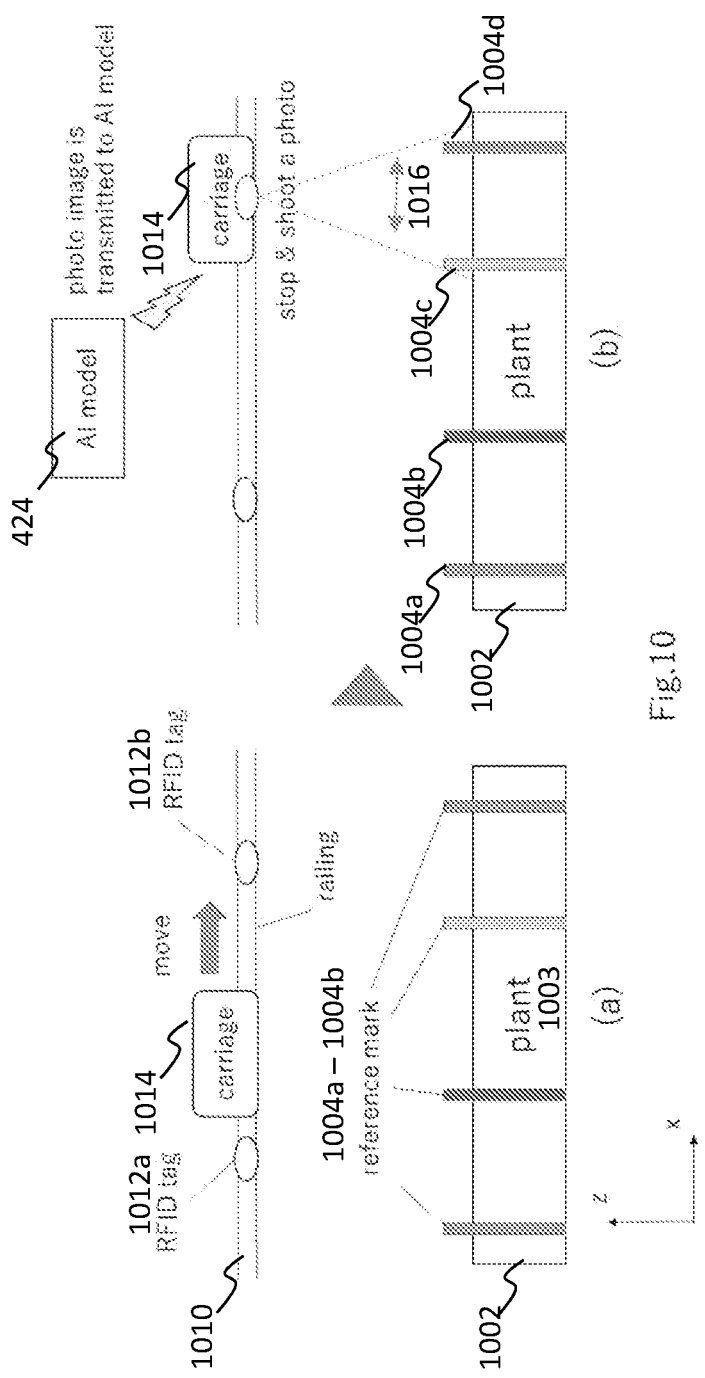
FIGS. 10A & 10B illustrate the process for acquiring and detecting images at a grow location.

Based on the object detection results generated at the completion of the detection module processing 424, the location of the grow tray is known and locations of leaves that are classified as defective are known and captured in the detection results data file, the location of all leaves classified as defective for the particular tray is exactly defined by using the X, Y location of the captured image and the detection results. Further, a Z region can be determined which includes the X, Y 2D region. This would allow for the display control module 426 to not generate Graphical User Interfaces (GUIs) that allow for a view of the classified leaves from a side (e.g. X, Z plane as shown in FIGS. 10-12) by using the X, Y coordinates and the Z region to display where the classified leaves will be found. As is discussed above in FIGS. 6-8, in addition to overlaying the identifiers that identify position of the leaves in the live-view image that are classified as defective, confidence detection values associated with each classified leaf may be displayed near the object that indicating a location of the defective leaf on the mobile device.

In another embodiment, a threshold value that indicates whether an object detected and classified as being defective may be set via input received at the mobile computing device while the augmented live view image is being displayed. If the threshold value is changed via the screen of the mobile device, the display of the object indicating the location of the pale leaf is updated. If a user changes the threshold from a first threshold to a second threshold via the screen of the mobile computing device, the second threshold is sent from the mobile computing device to the server 20 and the mobile computing device receives from the server 20 a location information of the classified object(s) having confidence value equal to or greater than second threshold and the augmented display is updated to only show objects (e.g. leaves) that were classified as defective having confidence values equal to or greater than the second threshold.

FIGS. 10-16 further illustrate the manner in which blocks 908-920 in FIG. 9 are performed. FIGS. 10A-10B illustrate the image capture and object detection processing performed to obtain detection results which are provided in block 902 to the mobile device as discussed in FIG. 9. FIGS. 10A and 10B include structures similar to those described in FIG. 2 and need not be further defined. Rather, the following description will focus on the operations performed in order to obtain images of a particular grow tray and the plants growing therein. FIGS. 10A and 10B illustrate a side view in the X-Z direction of a particular grow tray 1002 that is provided at a grow location. Included within the grow tray 1002, are one or more reference marks 1004a-1004b within the area including the plants and which are used for calibration and for uniquely identifying a region or location within the grow tray 1002.

An image capture structure 1010 is provided in the Z direction above the grow tray 12. The image capture structure 1010 includes a carriage 1014 with a camera (not shown). In one embodiment, the image capture structure is a rail system positioned above the grow tray to capture a top view of the plants in the grow tray 12. The carriage 1014 is moveable in the X direction as shown therein. The image capture structure 1010 includes one or more camera position identifiers 1012a and 1012b that are used to track the location of the camera on the carriage 101 during image capture. In one embodiment, the one or more camera position identifiers are RFID tags are provided at predetermined locations on the rail and which are read by a reader positioned on the carriage as the carriage moves along the rail during image capture operation. In FIG. 10B, the carriage 1014 stops at a position where camera position identifier 1012b is provided and image capture operation is initiated. As shown herein, a location of the camera position identifier 1012b defines a image capture field illustrated by the arrow labeled 1016 and includes region of the grow tray 1002 that includes tray markers 1004c and 1004d. The position information from both the camera position indicator 1012b and the tray markers 1004c and 1004d are provided along with the captured image to the server 20 to undergo detection processing performed by the detection module 424. Thus, not only can the detection module 424 determine which leaves are defective, the detection module 424 can also determine where each image was captured by the camera on carriage 1014 by using the camera position identifiers 1012 because this position is known. Finally, AI model can determine where the pale leaves are.

Figures 11A, 11B:
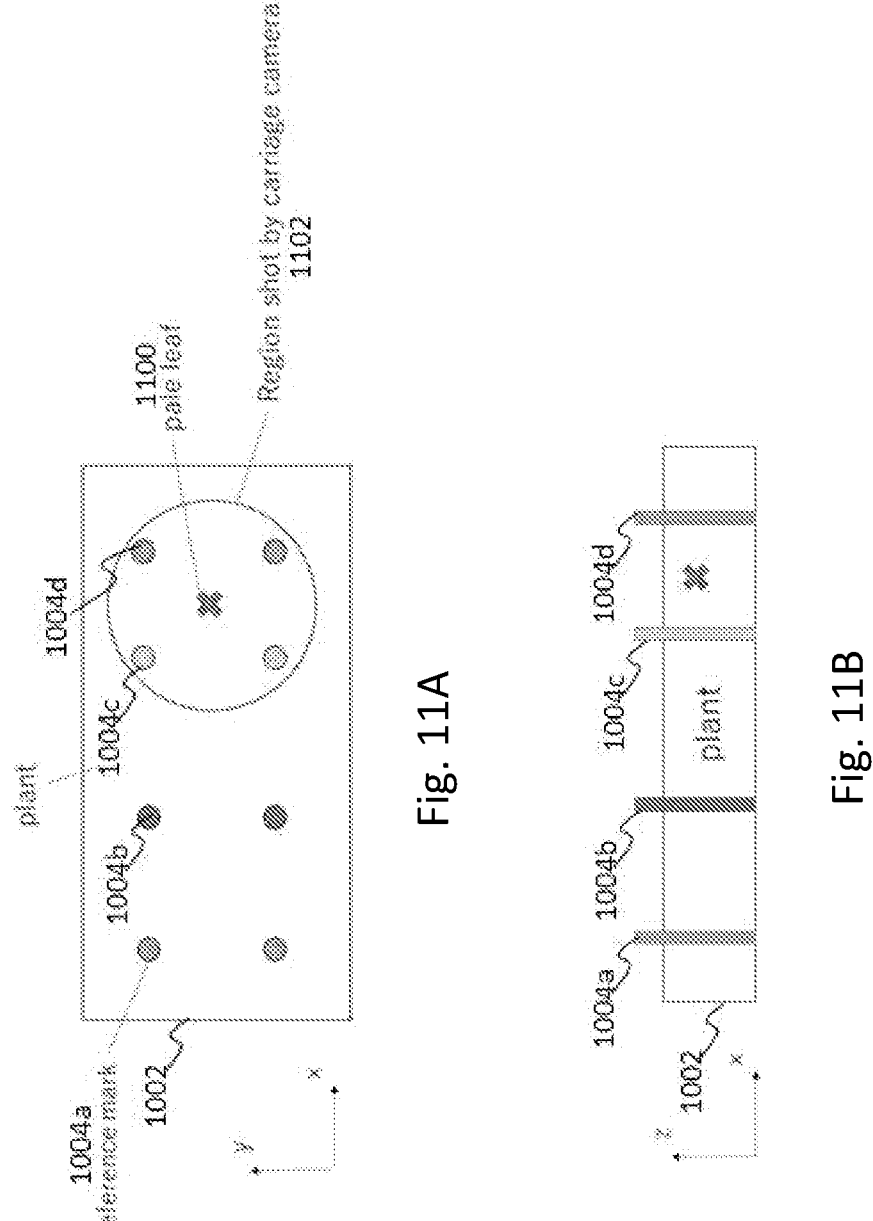
FIGS. 11A & 11B illustrate the process for acquiring and detecting images at a grow location and display thereof.
Figures 12A, 12B:
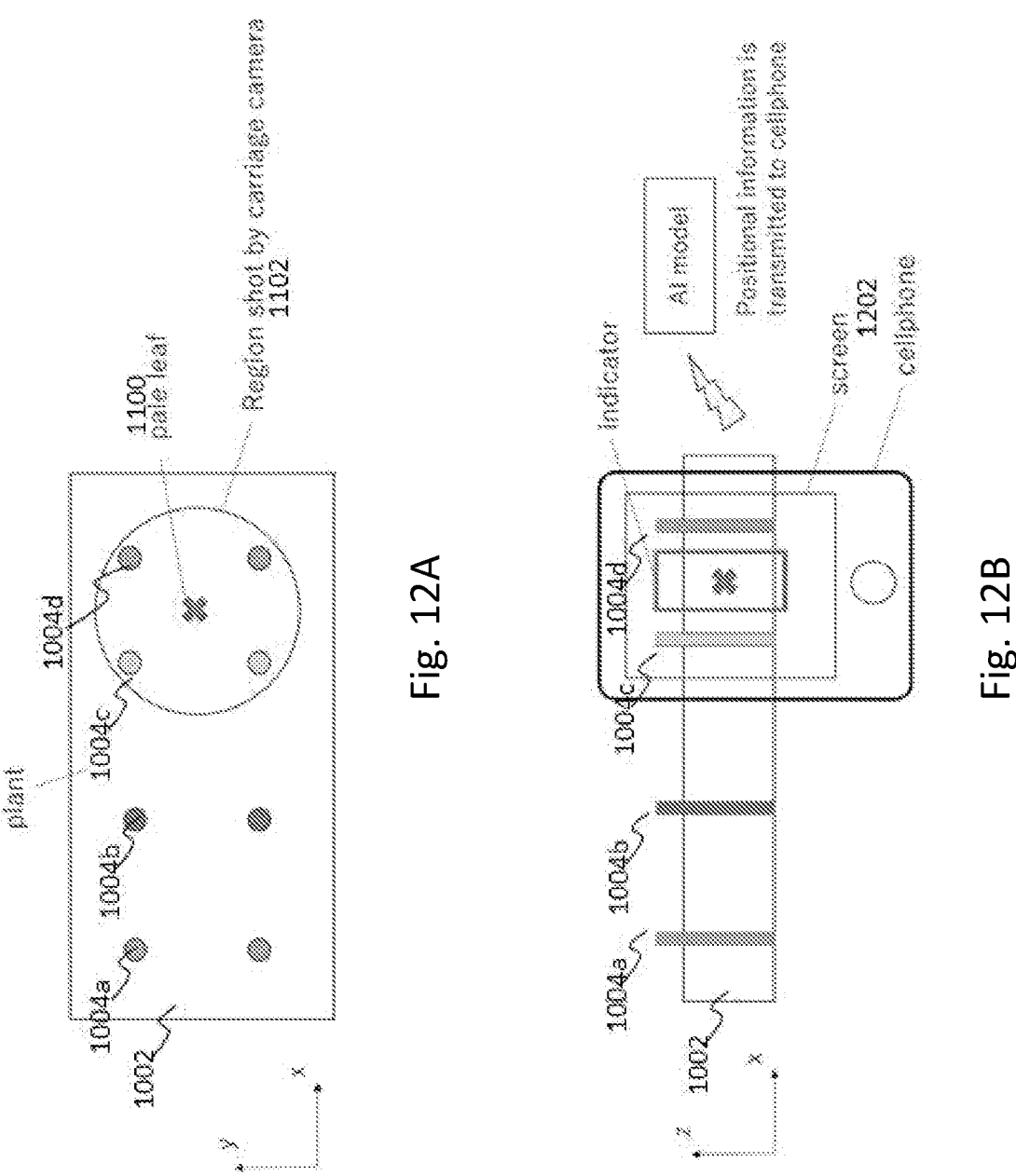
FIGS. 12A & 12B illustrate the process for acquiring and detecting images at a grow location and display thereof.

FIGS. 11A and 11B illustrate a position of a pale leaf which is one manner in which the detection module 424 determines that a leaf 1100 in grow tray 1002 is defective and a region 1102 captured by the image capture device on carriage 1014. FIG. 11A is a view in Z-direction whereas FIG. 11B is a view in Y-direction. In this example, the defective leaf 1100 is located between tray marker 1004c and 1004d which both represent reference marks within the tray. After determining a position of the defective leaf 1100 by the detection module 424, a user can locate the precise position of the defective leaf 1100 using the mobile computing device as shown in FIGS. 12A and 12B. The image capture device on the mobile computing device is initiated. Positional information determined during the detection operation 424 which identifies the defective leaf is transmitted to the mobile computing device 1202. As the image capture device of the mobile computing device 1202 is positioned facing a side of the grow tray 1002, the image capture operation captures tray markers 1004c and 1004d. From this, the application executing on the mobile computing device determines the location the defective leaf 1100 shown in FIG. 12A. To aid the user in visualizing, within the grow tray 1002, the location of the defective leaf 1100, a GUI with a guide is displayed. This is made possible because the location each leaf classified as defective can be determined because the position of the tray markers are known and a X-Y distance in pixels from the tray markers in the captured image can be obtained and used to identify the location of the defective leaf 1100.

In another embodiment, a GUI displayed on the mobile device may be changed from an image captured from above the grow tray 1002 (FIG. 12A) to an image captured from a side of the grow tray 1002 (FIG. 12B) in a case where an attitude of the mobile device is changed from a horizontal attitude to a vertical attitude. Also, an image displayed on the mobile device may be changed from an image captured from a side of the grow tray 1002 (FIG. 12B) to an image captured from above the grow tray 1002 (FIG. 12(a)) in a case where an attitude of the mobile device is changed from a vertical attitude to a horizontal attitude. The attitude of the mobile device can be detected by a tilt sensor included in the mobile device.

FIGS. 13-16 illustrate different manners for translating the image captured by the image capture device on the carriage 1014 and which has undergone object detection to a GUI that includes an augmented display that displays, on a display of a mobile computing device, an image of the grow tray with indicators identifying one or more leaves determined to be defective.

Figure 13:
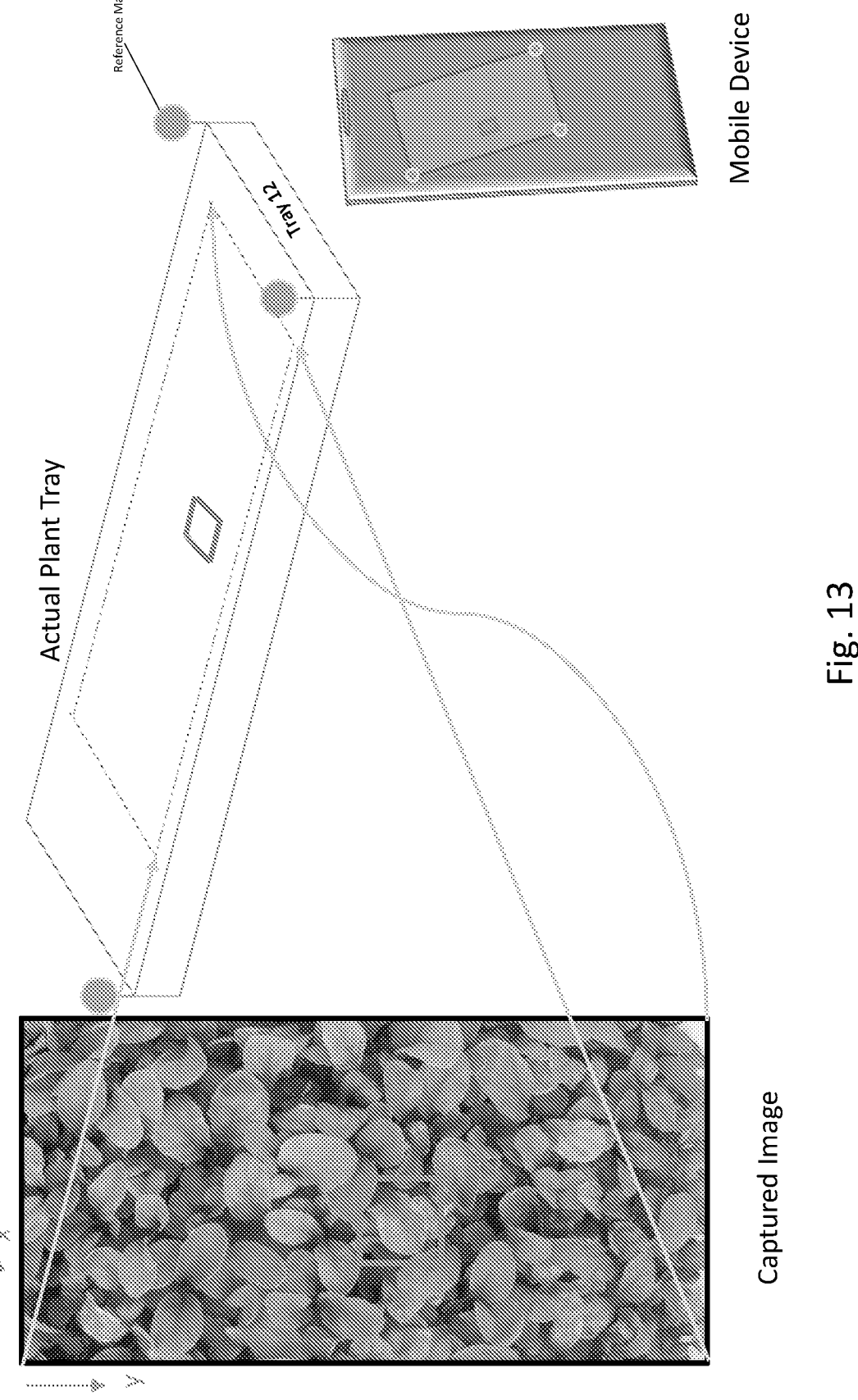
FIGS. 13-16 illustrate embodiments for translating acquired images having detection results for display on a mobile computing device.

In FIG. 13, a captured image of a plant tray is shown and includes arrows indicating how the captured image is transposed for display on a mobile computing device with an image capture device that is capturing the live view of the grow tray. The original captured image has undergone detection using the trained model and includes locations and sizes of each leave classified as defective as contained in the detection data file having x-y position values and h-w size values associated with each classification. In this embodiment, the live-view image being captures is of a region of the grow tray. The reference points on the actual plant tray that have a known location and distances from each other and allow for the captured image to be translated to the area that the mobile device is looking at to correctly overlay the detections contained in that region.

Figure 14:
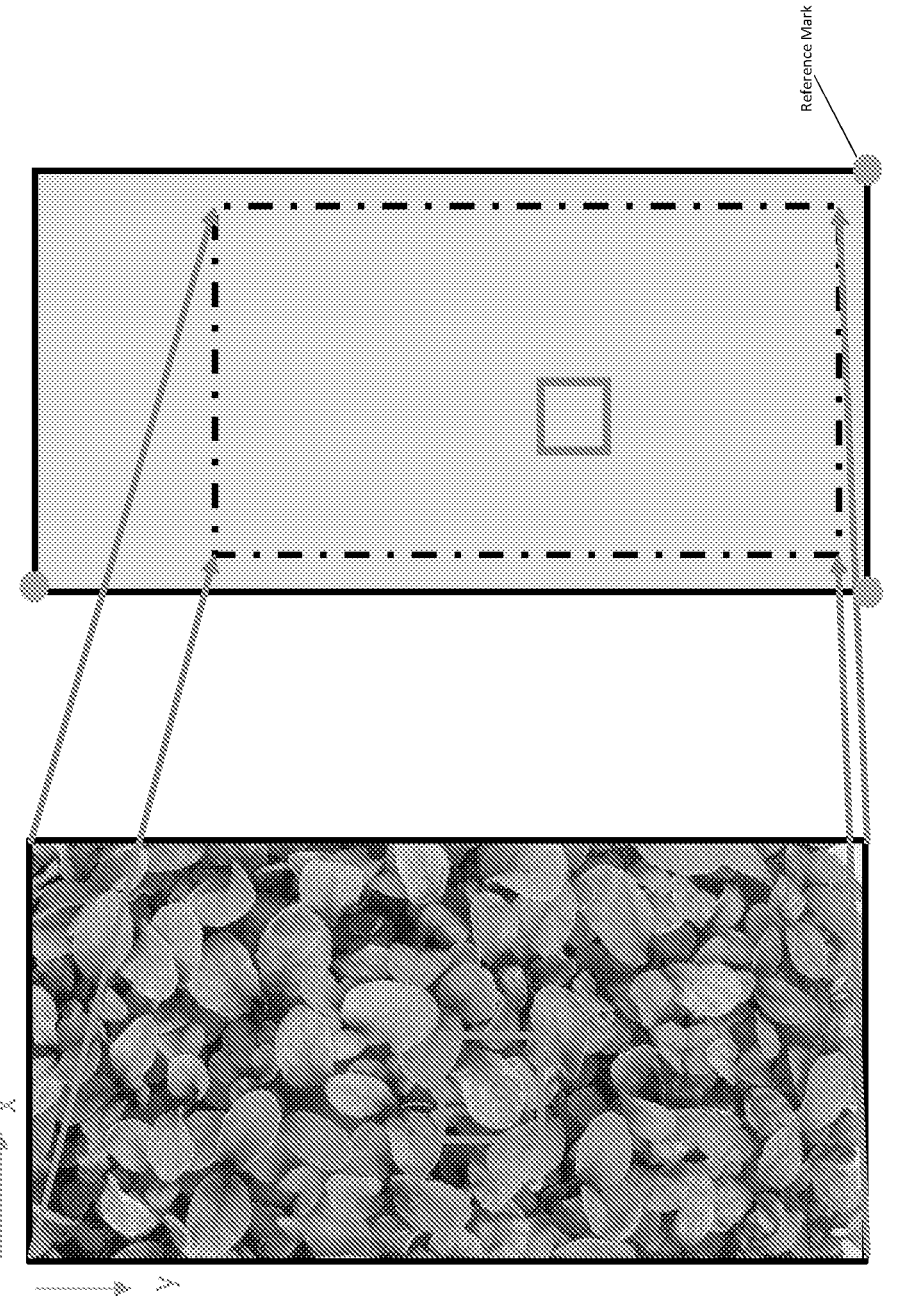

FIG. 14 illustrates another embodiment where a live-view image being captured by the mobile computing device includes a known width and height in pixels with an object classified as defective known to be at a x,y pixel location on that image and that has a defined width and height in pixels. In this embodiment, where reference points are not in the view of the captured image, a set or determined location for that captured image can be set from the reference points so that a mobile device with camera can accurately display the generated overlay that identifies the location(s) within the image having object that are classified as defective.

Figure 15:
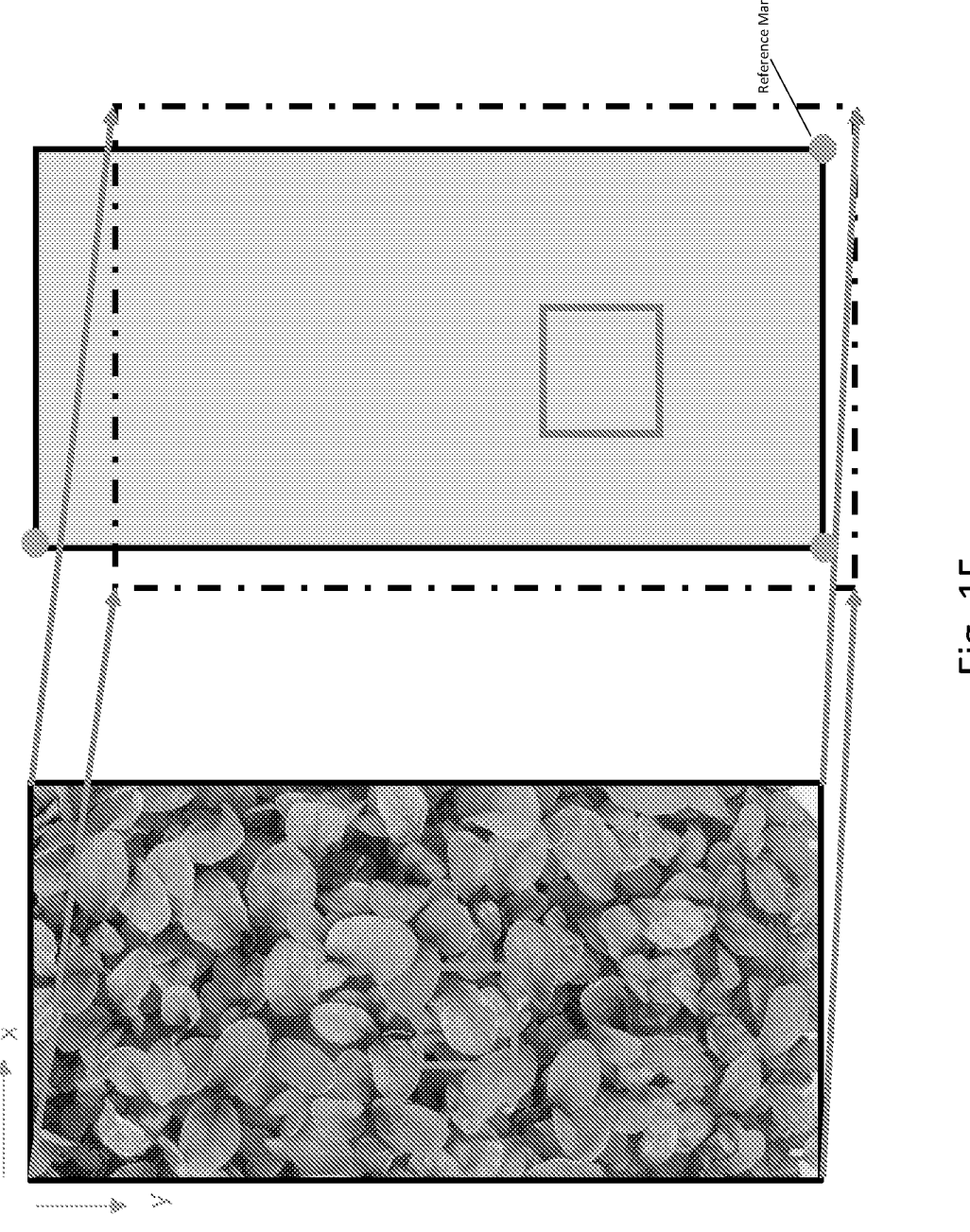
Figure 16:
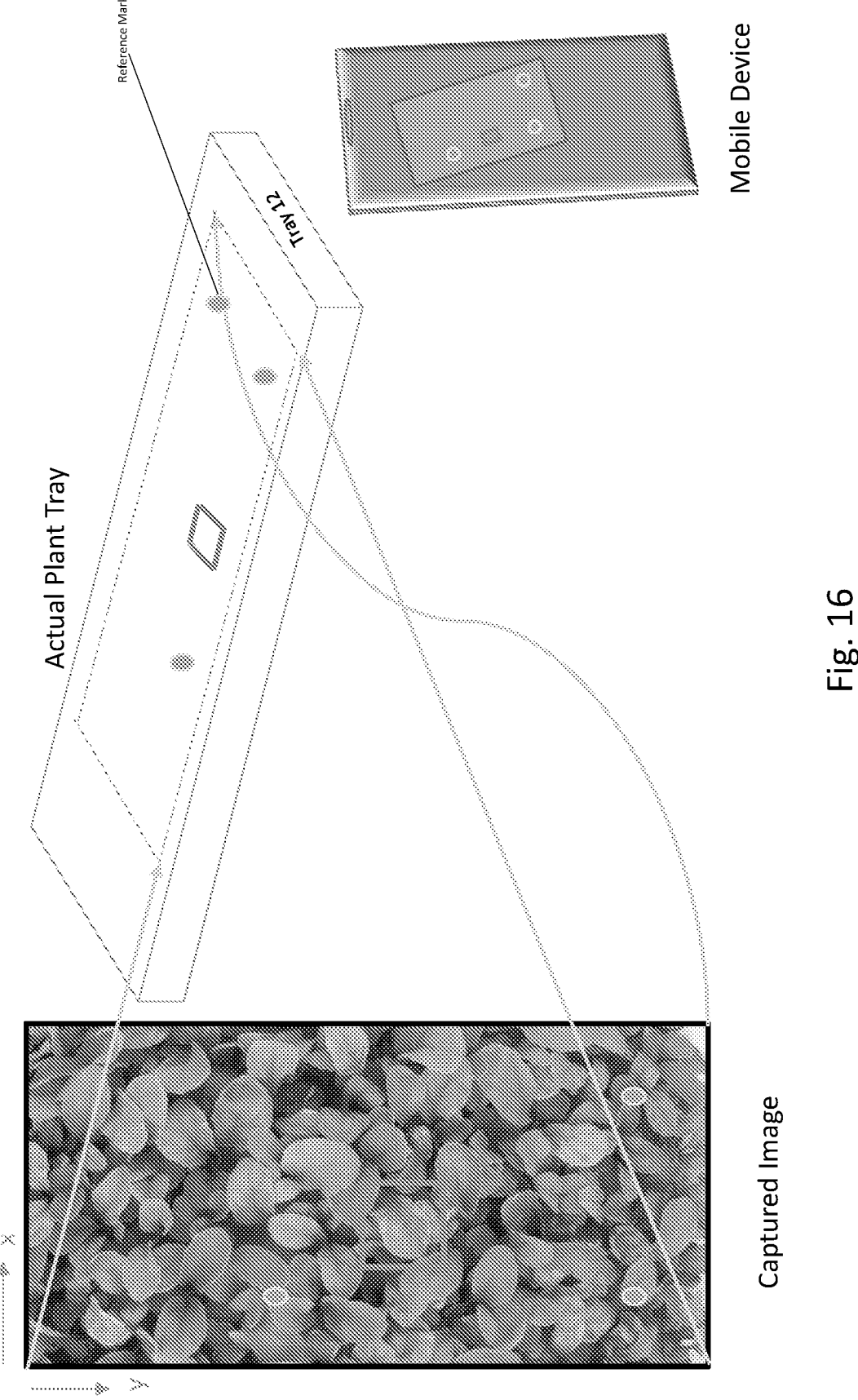

FIG. 15 illustrates another embodiment where a live-view image with a known width and height in pixels with an object classified as defective known to be at a x,y pixel location on that image and the classified object having defined width and height in pixels. In this embodiment, the reference markers are in the area of the captured image, so generating a detection area can be done by mapping the captured area to the live-view area of the mobile computing device. This is further illustrated in FIG. 16 which shows a captured image that has undergone detection processing, a grow tray from which that image was captured, and a mobile computing device having an image capture device that has a live-view of the grow tray. As noted, the original captured image has undergone detection processing by detection module 424 and includes the detection data identifying locations and sizes of each object in the image classified as defective. The captured image is of a region of the plant tray. Reference points on the actual grow tray have known location and distances from each other and are in the view of the original captured image. This enables the pixel location of the objects classified as defective to be mapped to the actual plant tray location and enables the GUI including the live view image of the grow tray to be augmented by overlaying indicators on the live-view image that identify the location within the grow tray of leaves classified as defective.

Figure 17:
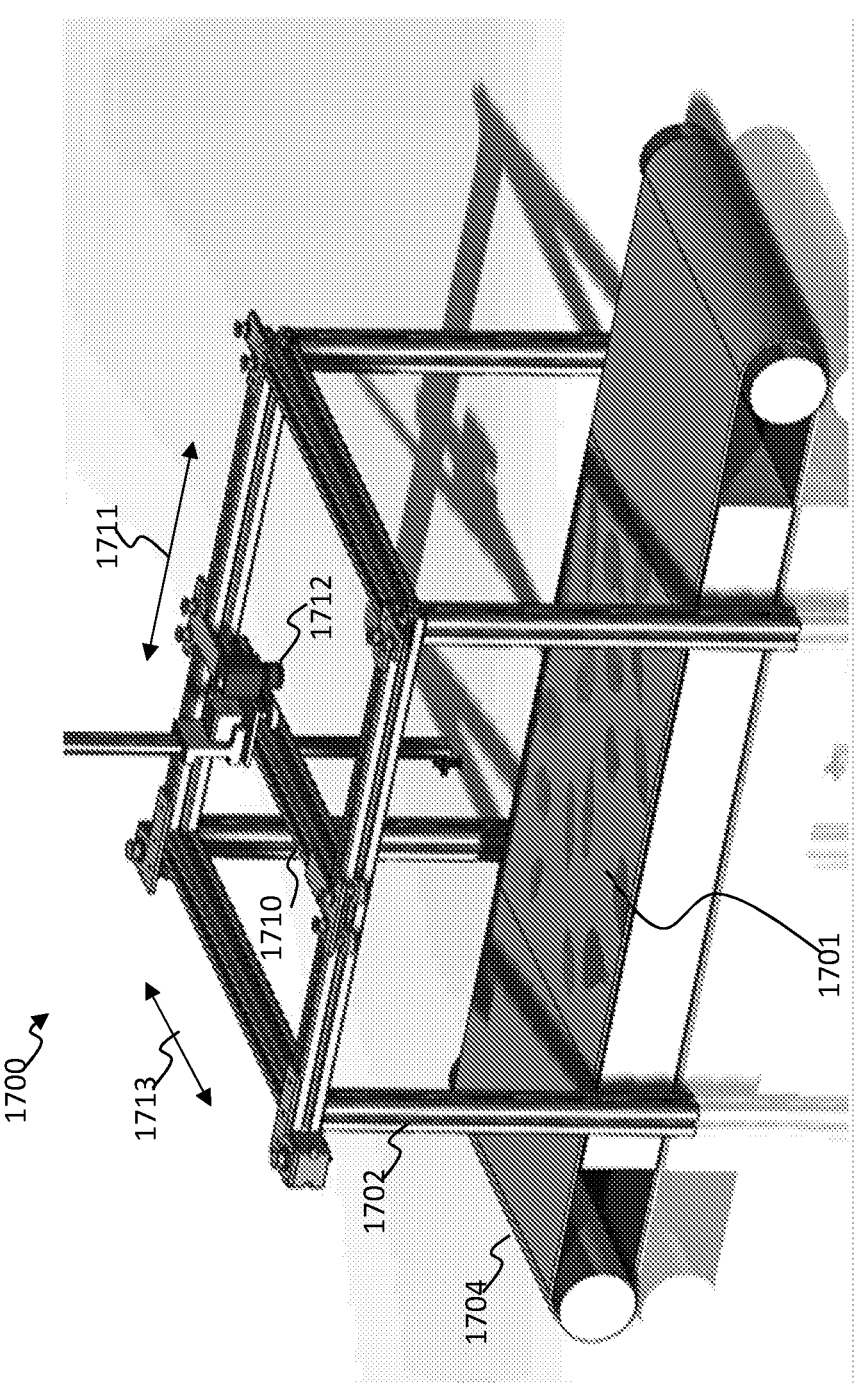
FIG. 17 illustrates a robotics apparatus that is controllable based on the results of the detection system.

In another embodiment, the results of the detection module processing may be used as input to control a robotics apparatus that automatically picks or removes leaves that are classified as defective. An exemplary robotics apparatus 1700 is illustrated in FIG. 17. The robotic apparatus 1700 includes a support structure 1702 positioned over a movement apparatus 1704. The movement apparatus 1704 is configured to move a grow tray 1701 beneath the support structure 1702 so that the grow tray 1701 is positioned in a predetermined position that allows for the robotics apparatus to excise defective leaves from within the grow tray 1701. To do this, the support structure includes a cross bar 1710 that supports an excise apparatus 1712. The cross bar 1710 is configured to move in a direction illustrated by the arrow labeled 1711. The excise apparatus 1712 is configured to move in a direction illustrated by the arrow labeled 1713 and in a direction towards and away from the grow tray 1701 positioned beneath the support structure. In operation, the movement and position of the cross bar 1710 and excise apparatus 1712 are determined based on the detection data file generated at the completion of the detection module 424. Because the particular grow tray on which detection was performed is known, the robotics apparatus can identify the grow tray currently positioned beneath the support apparatus based on one or more tray identifiers contained in the detection result data file. Further, actions of the robotics apparatus can be controlled based on detection locations which allows for an image to indicate a point of interest in the grow tray beneath the support structure to robotics controller which the controls the movements of the cross bar 1710 and excise apparatus 1712 to move to the point of interest. Once at the point of interest, the robotics controller signals the excise apparatus to move in a direction towards the grow tray 1701 and grab or otherwise excise the leave classified as defective. The movement control is performed by the robotics controller which maps the image to real world coordinates which serves as inputs for the robotic apparatus to move as discussed above. In operation, if the excise apparatus 1712 was to move to a pixel location within the image as defined in the detection data file, it would move to a corresponding location in the real world. Using this method, detection locations can be acted on by passing detection center point coordinates (x+width/2, y+height/2) to the robot either as the pixel locations, G-Code, or another format that can be acted upon by the robotics apparatus. As a result, the results of the processing performed by the detection module 424, defective objects from particular grow trays can be removed at greater speed and precision.

Figure 18:
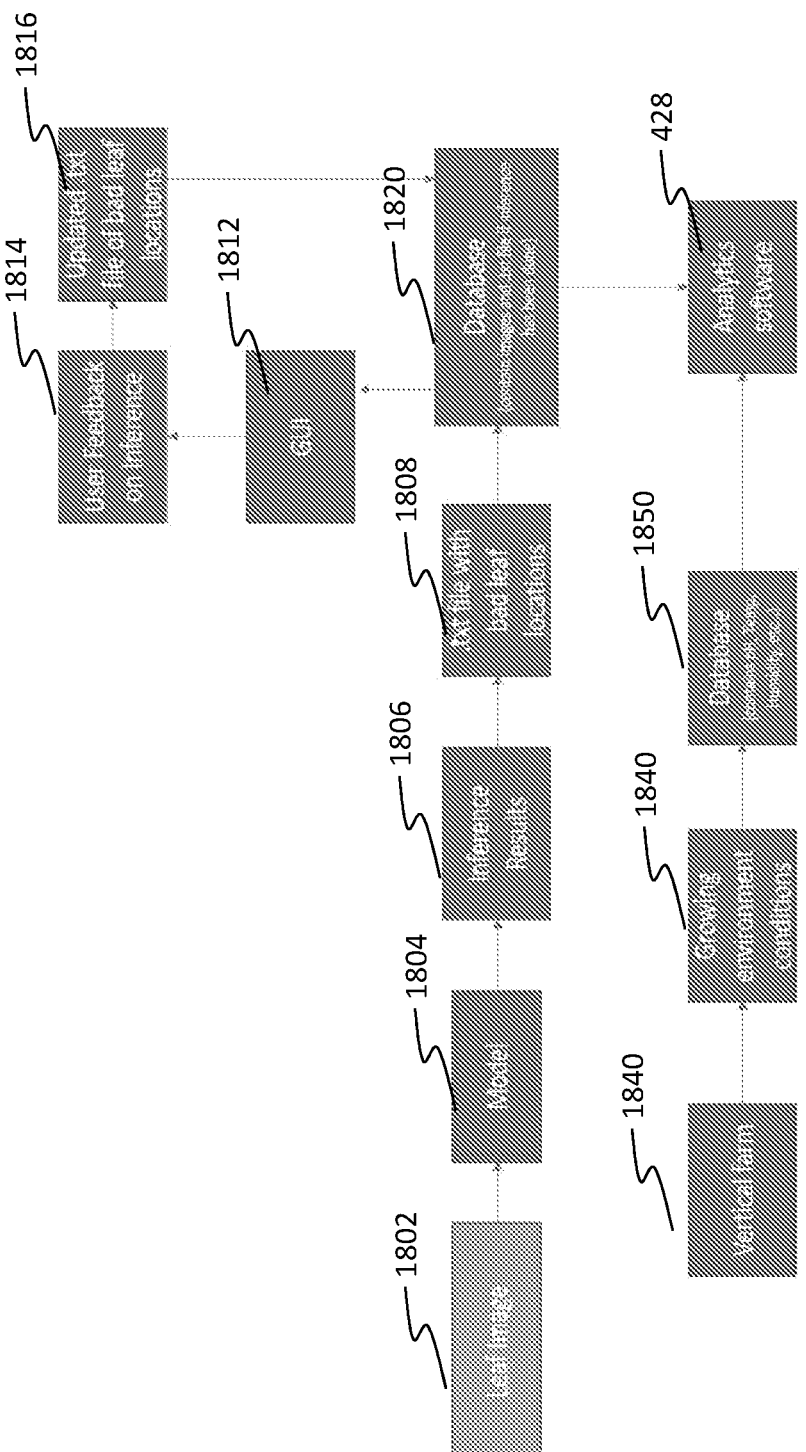
FIG. 18 is a flow diagram depicting an analytics algorithm that uses the results of the detection system.

In another embodiment, the result of the detection processing performed by detection module 424 includes combing the information on number and location of defective plants within one or more grow trays and information obtained from environmental sensor located at the grow location in order to track, quantify and qualify conditions of the plants in the one or more trays at the grow location. This processing is performed by an analytics module 428 in FIG. 4 being loaded into memory and which configures the one or more processors of the server 20 to perform analytics processing. FIG. 18 illustrates the operations performed by the analytics module 428 when executed.

In blocks 1802-1808, images of leaves in the one or more grow trays are captured and analyzed using the trained model during the detection processing performed by detection module 424 to yield detection results and image data which is stored in the tray database 438 in FIG. 4 and, as shown in FIG. 18 in block 1820. As these were discussed above, they need not be discussed again and are hereby incorporated herein by reference. Additionally, blocks 1812-1816 represent feedback processing performed by the detection module 424 and discussed herein above with respect to FIGS. 6-8. The details of this feedback to update detection results for further model training purposes and/or to provide a more accurate set of detection results also need not be further discussed and is incorporated herein by reference. The detection results stored in block 1820 is provided to the analytics module 428 along with environmental information obtained from one or more sensors 1840 that sense information about the environment at the grow location 1830. The information obtained at block 1840 includes information acquired by one or more sensors 16 representing any one or more of (a) temperature sensor that measure temperature of the entire grow location 11; (b) a moisture sensor that measures an amount of moisture in the grow location 11; (c) a soil sensor measuring one or more characteristics of the soil at grow location; and (d) a pH sensor that measures the pH at the grow location. Environmental information obtained in block 1840 is stored in the tray database 438 on a tray-specific basis identifying environmental conditions at the particular tray, a rack-specific basis identifying environmental conditions across all trays in a particular support structure, a region-specific basis indicating environmental conditions across a particular region within a grow location, and a location-specific basis indicating environmental conditions globally at the grow location.

Figure 19:
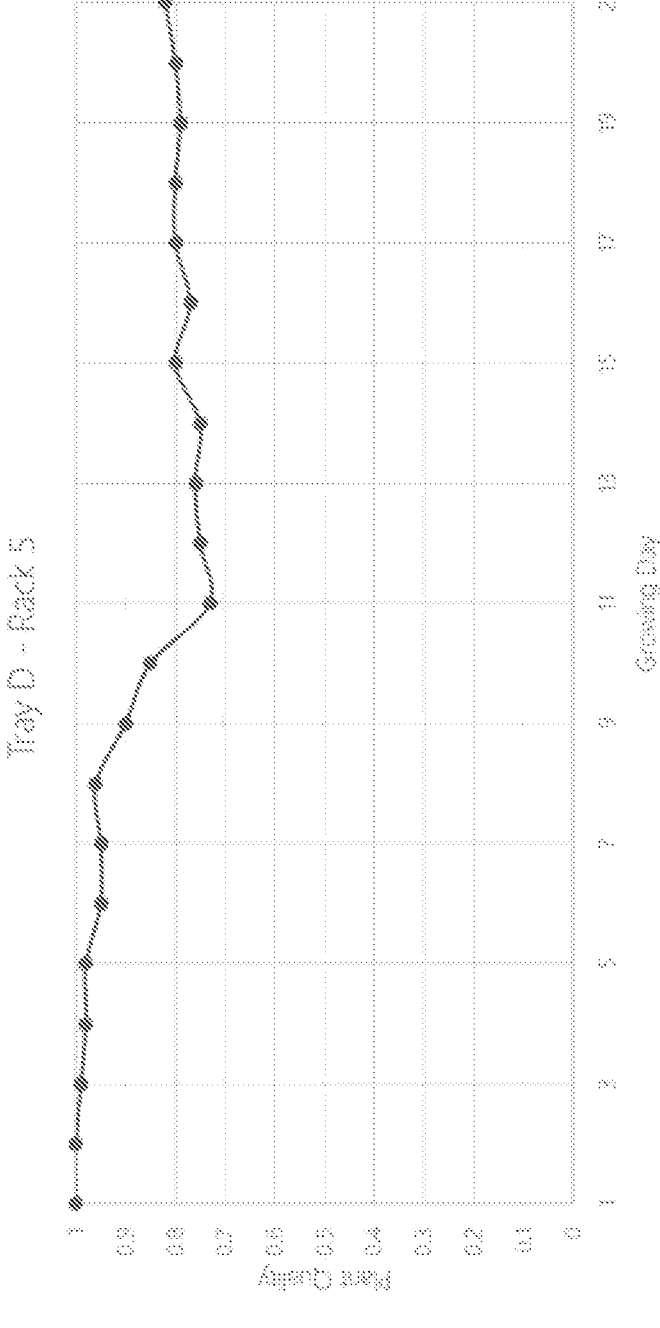
FIG. 19 is a graph representing an exemplary output of the analytics algorithm of FIG. 18.

The information from the environmental conditions database 1830 and detection results at the tray database 1820 is provided as an input to the analytics module 428 executing on the server. The analytics module 428 is able to perform prediction, monitoring, historic tracking, alerts, and grow trends at the grow location. The resulting text file from the object detection model can be used to quantify and qualify the condition or health and how condition and health are changing by creating a database of results for plant growth at various tray locations and tracking the object detection results across the tray locations. The ability to identify bad leaves on a growing tray allows for the ability to count/track the number of bad leaves on that tray, which also allows for the ability to compare the number of bad leaves to the historic growing conditions (temperature, humidity, pH, etc. . . . ) as well as, the ability to track the change in number of bad leaves from day to day. This results of the analytics processing can produce a graph shown in FIG. 19 that identifies the quality of the plants growing in a particular location over a series of growing days as determined based on a number of leaves classified on each growing day as defective. In one embodiment, this is calculated by dividing the number of sum of the total leaves on a tray minus the number of anomalous/bad detected leaves on that tray by the total leaves on that tray to give you a percentage quality score. This would be expressed by ((#Total leaves−#Bad leaves)/#Total leaves)=% Quality score.

The detection and display system according to the present disclosure advantageously identifies plant leaf condition automatically using a trained machine learning object detection model which is operative on an image containing a plurality of plant leaves and can cover a large number of leaves very fast and successfully distinguish individual leaves from one another. Further, based on the detection and classification of leaves as defective, the system can track the quality of all the plants on a growing tray and give it a quality score and be used to generate historic quality data. The results of the detection may be used as direct inputs for controlling automation solutions which would now allow for picking or sorting to be done by a robot apparatus. Further, the detection and display system can translate and augment a live view image of particular grow tray with identifiers such as boxes/coordinates/locations of all leaves classified as defective.

Aspects of the present disclosure can also be realized by a computer of a system or apparatus (or devices such as a CPU, a micro processing unit (MPU), or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments.

I claim:

1. A server comprising:

at least one memory storing instructions; and at least one processor that, upon execution of the stored instructions, is configured to obtain, from an image capture device, an image that includes a plurality of plants growing in at least one grow tray and one or more tray markers identifying each of the at least one grow tray;

execute detection processing on the obtained image of the plants growing in the at least one grow tray using a trained model to classify each of the plurality of plants into a first category indicative of a defective plant or a second category indicative of a normal plant and generate information indicating a classification accuracy associated with each of the plants classified in the first category, wherein the trained model is a machine learning model trained using one or more visual characteristics of leaves of the plurality of plants indicating a defective plant;

determine, from the obtained image, position information for each of the plurality of plants classified in the first category, the position information being determined using the one or more tray markers associated with the at least one tray and captured in the obtained image;

generate, using the one or more tray markers in the position information, a map of the plurality of plants classified in the first category including an identifier around each of the plurality of plants classified in the first category; and provide the generated map and a live view image of the at least one grow tray being captured by the image capture device to an application executing on a terminal device causing an augmented reality view to be generated for display on a display of the terminal device, wherein the augmented reality view includes the live view image of the plurality of plants in the at least one grow tray and the identifier providing visual representation of a location of each plant classified in the first class as a defective plant, wherein each identifier includes the generated information depicting an accuracy of the classification.

2. The server according to claim 1, wherein the detection processing including a first analysis and a second analysis, the first analysis identifies a shape of leaves in the image of the plurality of plants, and the second analysis identifies defective leaves.

3. The server according to claim 1, wherein execution of the instructions further configures the at least one processor to receive, from the terminal device, a request to change a respective plant classified in the first category to be classified in the second category;

update the generated map based on the received change request, and use the updated map to cause the respective plant changed from the first category to the second category to not be identified within the image.

4. The server according to claim 3, wherein execution of the instructions further configures the at least one processor to store, in the at least one memory, the updated map in association with obtained image as corrected image data, the updated map including plants classified in the first category using the trained model and plants having been corrected by a user;

providing the corrected image data to training module used in generating the trained model to generate an updated trained model.

5. The server according to claim 1, wherein execution of the instructions further configures the at least one processor to in response to detecting that the terminal device is proximate to the image capture device, communicate the generated map to an application executing on the terminal device causing the application to generate an augmented reality view including a live view of the plurality of plants having one or more indicators from the map overlaid on the captured live view of the plurality of plants.

6. The server according claim 1, wherein execution of the instructions further configures the at least one processor to control a picking device using the generated map to cause the picking device to remove each of the plants classified in the first category using the position information within the map.

7. The server according to claim 1, wherein execution of the instructions configures the at least one processor to continually obtain over a period of time, from the image capture device, images of a plurality of plants;

for each of the continually obtained images, execute detection processing using the trained model to classify each of the plurality of plants into the first category indicative of a defective plant having a confidence score below a predetermined confidence threshold or a second category indicative of a normal plant, wherein the trained model is a machine learning model trained using one or more visual characteristics associated with the plurality of plants indicating a defective plant;

generating, a quality score representing the plurality of plants based on a number of respective ones of the plurality of plants being classified in the first category;

using the quality score to control one or more parameters used to grow the plurality of plants.

8. A method of classifying plants comprising:

obtaining, from an image capture device, an image that includes of a plurality of plants growing in at least one grow tray and one or more tray markers identifying each of the at least one grow tray;

executing, by at least one processor, detection processing on the obtained image of the plants growing in the at least one grow tray using a trained model to classify each of the plurality of plants into a first category indicative of a defective plant or a second category indicative of a normal plant and generate information indicating a classification accuracy associated with each of the plants classified in the first category, wherein the trained model is a machine learning model trained using one or more visual characteristics of leaves of the plurality of plants indicating a defective plant;

determining, from the obtained image by the at least one processor, position information for each of the plurality of plants classified in the first category, the position information being determined using the one or more tray markers associated with the at least one tray and captured in obtain image;

generating, using the one or more tray markers in the position information by the at least one processor, a map of the plurality of plants classified in the first category including an identifier around each of the plurality of plants classified in the first category; and providing the generated map and a live view image of the at least one grow tray being captured by the image capture device to an application executing on a terminal device causing an augmented reality view to be generated for display on a display of the terminal device, wherein the augmented reality view includes the live view image of the plurality of plants in the at least one grow tray and the identifier providing visual representation of a location of each plant classified in the first class as a defective plant, wherein each identifier includes the generated information depicting an accuracy of the classification.

9. The method according to claim 8, wherein the detection processing including a first analysis and a second analysis, the first analysis identifies a shape of leaves in the image of the plurality of plants, and the second analysis identifies defective leaves.

10. The method according to claim 8, further comprising receiving, from the terminal device, a request to change a respective plant classified in the first category to be classified in the second category;

updating the generated map based on the received change request, and using the updated map to cause the respective plant changed from the first category to the second category to not be identified within the image.

11. The method according to claim 10, further comprising storing, in the at least one memory, the updated map in association with obtained image as corrected image data, the updated map including plants classified in the first category using the trained model and plants having been corrected by a user;

providing the corrected image data to training module used in generating the trained model to generate an updated trained model.

12. The method according to claim 8, further comprising in response to detecting that the terminal device is proximate to the image capture device, communicate the generated map to an application executing on the terminal device causing the application to generate an augmented reality view including a live view of the plurality of plants having one or more indicators from the map overlaid on the captured live view of the plurality of plants.

13. The method according claim 8, further comprising controlling a picking device using the generated map to cause the picking device to remove each of the plants classified in the first category using the position information within the map.

14. The method according to claim 8, further comprising continually obtaining over a period of time, from the image capture device, images of a plurality of plants;

for each of the continually obtained images, executing detection processing using the trained model to classify each of the plurality of plants into the first category indicative of a defective plant having a confidence score below a predetermined confidence threshold or a second category indicative of a normal plant, wherein the trained model is a machine learning model trained using one or more visual characteristics associated with the plurality of plants indicating a defective plant;

generating, a quality score representing the plurality of plants based on a number of respective ones of the plurality of plants being classified in the first category;

using the quality score to control one or more parameters used to grow the plurality of plants.

15. A non-transitory storage medium that stores instructions, that when executed by one or more processers, configures the one or more processors to perform:

obtaining, from an image capture device, an image that includes a plurality of plants growing in at least one grow tray and one or more tray markers identifying each of the at least one grow tray;

executing, by at least one processor, detection processing on the obtained image of the plants growing in the at least one grow tray using a trained model to classify each of the plurality of plants into a first category indicative of a defective plant or a second category indicative of a normal plant and generate information indicating a classification accuracy associated with each of the plants classified in the first category, wherein the trained model is a machine learning model trained using one or more visual characteristics of leaves of the plurality of plants indicating a defective plant;

determining, from the obtained image by the at least one processor, position information for each of the plurality of plants classified in the first category, the position information being determined using the one or more tray markers associated with the at least one tray and captured in the obtained image;

generating, using the one or more tray markers in the position information by the at least one processor, a map of the plurality of plants classified in the first category including an identifier around each of the plurality of plants classified in the first category; and providing the generated map and a live view image of the at least one grow tray being captured by the image capture device to an application executing on a terminal device causing an augmented reality view to be generated for display on a display of the terminal device, wherein the augmented reality view includes the live view image of the plurality of plants in the at least one grow tray and the identifier providing visual representation of a location of each plant classified in the first class as a defective plant, wherein each identifier includes the generated information depicting an accuracy of the classification.

16. A server comprising:

at least one memory storing instructions; and at least one processor that, upon execution of the stored instructions, is configured to obtain, from an image capture device, an image that includes of a plurality of plants growing in at least one grow tray and one or more tray markers identifying each of the at least one grow tray;

execute detection processing on the obtained image of the plants growing in the at least one grow tray using a trained model to classify each of the plurality of plants into a first category indicative of a defective plant or a second category indicative of a normal plant and generate information indicating a classification accuracy associated with each of the plants classified in the first category, wherein, the detection processing including a first analysis and a second analysis, the first analysis identifies a shape of leaves in the image of the plurality of plants, and the second analysis identifies defective leaves wherein the trained model is a machine learning model trained using one or more visual characteristics of leaves of the plurality of plants indicating a defective plant;

determine, from the obtained image, position information for each of the plurality of plants classified in the first category, the position information being determined using the one or more tray markers associated with the at least one tray and captured in the obtained image;

generate, using the one or more tray markers in the position information, a map of the plurality of plants classified in the first category including an identifier around each of the plurality of plants classified in the first category; and provide the generated map and a live view image of the at least one grow tray being captured by the image capture device to an application executing on a terminal device causing an augmented reality view to be generated for display on a display of the terminal device, wherein the augmented reality view includes the live view image of the plurality of plants in the at least one grow tray and the identifier providing visual representation of a location of each plant classified in the first class as a defective plant, wherein each identifier includes the generated information depicting an accuracy of the classification.

* * * * *